(12) United States Patent
Fukumine et al.

(10) Patent No.: US 10,033,042 B2
(45) Date of Patent: *Jul. 24, 2018

(54) POSITIVE ELECTRODE FOR SECONDARY BATTERY, AND SECONDARY BATTERY

(71) Applicant: ZEON CORPORATION, Tokyo (JP)

(72) Inventors: Mayumi Fukumine, Kanagawa-ken (JP); Kei Kobayashi, Tokyo (JP); Arinobu Katada, Kanagawa-ken (JP)

(73) Assignee: ZEON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/382,297

(22) PCT Filed: Mar. 1, 2013

(86) PCT No.: PCT/JP2013/055709
§ 371 (c)(1),
(2) Date: Aug. 29, 2014

(87) PCT Pub. No.: WO2013/129658
PCT Pub. Date: Sep. 6, 2013

(65) Prior Publication Data
US 2015/0050555 A1     Feb. 19, 2015

(30) Foreign Application Priority Data
Mar. 2, 2012   (JP) ................ 2012-046641

(51) Int. Cl.
| H01M 4/62 | (2006.01) |
| H01M 4/13 | (2010.01) |
| H01M 10/052 | (2010.01) |
| H01M 10/0525 | (2010.01) |

(52) U.S. Cl.
CPC ......... *H01M 4/623* (2013.01); *H01M 4/13* (2013.01); *H01M 4/622* (2013.01); *H01M 4/624* (2013.01); *H01M 10/052* (2013.01); *H01M 10/0525* (2013.01); *H01M 2220/30* (2013.01)

(58) Field of Classification Search
None
See application file for complete search history.

(56) References Cited

U.S. PATENT DOCUMENTS

| 5,595,841 A | 1/1997 | Suzuki | |
|---|---|---|---|
| 2004/0020763 A1 | 2/2004 | Kanzaki et al. | |
| 2004/0062989 A1 | 4/2004 | Ueno et al. | |
| 2005/0266310 A1* | 12/2005 | Chia ............. | H01M 4/133 429/217 |
| 2006/0257739 A1* | 11/2006 | Ryu ............. | H01M 4/13 429/217 |
| 2006/0275661 A1 | 12/2006 | Kim et al. | |
| 2009/0311609 A1* | 12/2009 | Saisho ............. | H01M 4/13 429/337 |
| 2011/0111295 A1* | 5/2011 | Yamada ............. | H01M 4/131 429/217 |
| 2012/0183848 A1* | 7/2012 | Kang ............. | H01M 4/622 429/211 |
| 2015/0030922 A1* | 1/2015 | Kobayashi ............. | H01M 4/622 429/217 |
| 2015/0050554 A1* | 2/2015 | Fukumine ............. | H01M 4/622 429/217 |

FOREIGN PATENT DOCUMENTS

| JP | 08-287915 A | 11/1996 |
|---|---|---|
| JP | 2004-185826 A | 7/2004 |
| JP | 3624921 B2 | 3/2005 |
| JP | 2006-269386 A | 10/2006 |
| JP | 2012-014920 A | 1/2012 |
| JP | 2013-051203 A | 3/2013 |
| JP | 2013-055049 A | 3/2013 |
| KR | 2012-0014634 A | 2/2012 |
| WO | 2006/123892 A1 | 11/2006 |
| WO | 2013/018862 A1 | 2/2013 |

OTHER PUBLICATIONS

Specification Sheet for Ethylene glycol dimethacrylate. From www.sigmaaldrich.com. Retrieved Jul. 7, 2016.*
The extended European search report issued by the European Patent Office dated Nov. 18, 2015, which corresponds to European Patent Application No. 13755808.6-1359 and is related to U.S. Appl. No. 14/382,297.
International Preliminary Report on Patentability (Chapter I) and translation of Written Opinion of the International Searching Authority; PCT/JP2013/055709; dated Sep. 2, 2014.
International Search Report; PCT/JP2013/055709; dated May 14, 2013.
Communication Pursuant to Article 94(3) EPC issued by the European Patent Office dated Sep. 6, 2017, which corresponds to EP13755808.6-1373 and is related to U.S. Appl. No. 14/382,297.

* cited by examiner

*Primary Examiner* — Alix Echelmeyer Eggerding
(74) *Attorney, Agent, or Firm* — Studebaker & Brackett PC

(57) ABSTRACT

A positive electrode for a secondary battery wherein the electrode includes a collector and a positive electrode active material layer which is stacked upon the collector, and which includes a positive electrode active material, a conductive agent, and a binder; the binder includes a first polymer and a second polymer; the first polymer is a fluorine-containing polymer; the second polymer includes a polymerized moiety having a nitrile group, a polymerized moiety having a hydrophilic group, a polymerized (meth)acrylic acid ester moiety, and a straight-chain polymerized alkylene moiety having a carbon number of at least 4; the proportion of the first polymer and the second polymer in the binder, expressed as a mass ratio, is in the range of 95:5 to 5:95.

16 Claims, No Drawings

POSITIVE ELECTRODE FOR SECONDARY BATTERY, AND SECONDARY BATTERY

TECHNICAL FIELD

The present invention relates to a positive electrode used for the secondary battery of the lithium ion secondary battery.

BACKGROUND ART

Recently, the portable terminals such as laptop computer, mobile phone and PDA (Personal Digital Assistance) are widely used. For secondary batteries used for power sources of these portable terminals, nickel hydrogen secondary battery, lithium ion secondary battery or so are heavily used. The portable terminals are rapidly downsized, made thinner, have become lighter, and has higher performance. As a result, the portable terminals are used in various occasions. Also, for the battery, it is required to be downsized, made thinner, to be lighter and to have higher performance.

As for the positive electrode active material which is the constitution material of the lithium ion secondary battery, the active material comprising the transition metal such as iron, manganese, cobalt, chromium and copper or so are used. When the charge-discharge is repeated in the secondary battery using this active material, the transition metal ions elutes out to the electrolytic solution, and as a result, the battery capacity or the cycle characteristic may decline in some cases, which has become a significant problem.

Also, the transition metal eluted from the positive electrode is deposited at the negative electrode surface by reduction; thereby the dendritic metal deposition is formed. As a result, this damages the separator, and the safety of the battery declines which has become a significant issue as well.

The electrodes used in the lithium ion secondary battery usually has a structure wherein the electrode active material layer is stacked on the current collector; and at the electrode active material layer, besides the electrode active material, the polymer binder (it may be referred as "binder" in below) which binds the electrode active materials with each other, and also the electrode active material and the current collector is used. The electrode is usually produced by obtaining the slurry composition by mixing the binder composition wherein the polymer which becomes the binder is dispersed or dissolved with water or the organic solvent or so, with the active material and the conductive agent such as conductive carbon or so if needed; then this slurry composition is coated on the current collector, then dried thereby the electrode is produced.

In the polymer binder, particularly as the polymer binder of the positive electrode, a fluorine based polymer such as polyvinylidene fluoride (PVDF) has been preferably used since it is difficult to dissolve against the organic electrolytic solution.

However, fluorine based polymer such as polyvinylidene fluoride has week adhesive force against the current collector, and there was a problem that battery capacity declines due to the deterioration of the electrical connection between the electrode active material layer and the current collector by repeating the charge-discharge. Also, if the amount of the fluorine based polymer such as polyvinylidene fluoride is increased in order to enhance the adhesive force with the current collector, the internal resistance of the battery increased which causes the capacity to decline.

The patent document 1 proposes to improve the energy density and the cycle characteristic of the battery by using both of the fluorine based polymer such as polyvinylidenefluoride based polymer which has small insulation coating effect against the active material, and acrylonitrile-butadiene rubber or hydrogenated acrylonitrile-butadiene rubber (H-NBR) having excellent adhesiveness.

Also, the patent document 2 proposes to suppress the reduction of the battery capacity even after the large electric current discharge and to suppress the reduction of the battery capacity even after repeating the charging and discharging, by forming the flexible electron conduction network by making the content ratio of the conductive agent in the positive electrode active material layer 1 to 25 times more of the content ratio of the acrylonitrile-butadiene rubber.

PRIOR ART DOCUMENT

Patent document 1: JP Patent Application Laid Open No. H09-63590

Patent document 2: JP Patent Application Laid Open No. 2005-123047

SUMMARY OF THE INVENTION

Technical Problems to be Solved by the Invention

In the patent documents 1 and 2, it describes that by using the binder including PVDF and H-NBR, the cycle characteristic and the output characteristic of the secondary battery can be improved.

However, recently in order to achieve higher energy density of the battery, the positive electrode has become to have higher density and thicker thickness; and according to the keen examination by the present inventor, by using the binder of the patent documents 1 and 2, it was discovered that excellent flexibility and the binding property are difficult to maintain when designing the higher electrode and the thicker electrode. Also, the problem of breaking and cracking of the electrode active material layer during the winding of the positive electrode were also discovered. Therefore, the positive electrode having high flexibility and binding property when designing the high density and thickness, and also having the electrode active material layer having high density is in great demand.

Also, in order to improve the output characteristic of the battery, the positive electrode active material having the large specific area and small particle diameter is used in many cases. In case of using such positive electrode active material, further more binder is necessary since the area binding with the binder increases. Thus, the resistance of the electrode increases as the binder amount which is the insulation component increases; thereby there was a risk that the output characteristic and the cycle characteristic of the battery deteriorate together.

Further, when the binder proposed in the patent documents 1 and 2 are used, the dispersibility of the conductive agent and the electrode active materials are insufficient, the slurry composition forming the electrode active material layer has poor stability, hence a smooth electrode was difficult to obtain.

The object of the present invention is to provide the positive electrode having high flexibility and binding property even when designing the high density and thickness, and also having high density even before the press; and to provide the secondary battery having high cycle characteristic (particularly, the high temperature characteristic).

Means for Solving the Problems

The gist of the present invention trying to solve the above problems is as follows.

[1] A positive electrode for a secondary battery comprising a current collector, and a positive electrode active material layer stacked on said current collector and having a positive electrode active material, a conductive agent and a binder; wherein
said binder includes a first polymer and a second polymer,
said first polymer is fluorine containing polymer,
said second polymer includes a polymer unit having a nitrile group, a polymer unit having a hydrophilic group, (meth)acrylate polymer unit, and a polymer unit of linear alkylene having carbon atoms of 4 or more, and
a ratio between said first polymer and said second polymer in said binder is 95:5 to 5:95 in terms of weight ratio.

[2] The positive electrode for the secondary battery as set forth in [1], wherein said first polymer is at least one selected from the group consisting of polyvinylidene fluoride, polytetrafluoroethylene, vinylidene fluoride-hexafluoropropylene copolymer, polyvinylidene fluoride, and tetrafluoroethylene-perfluoroalkyl vinyl ether copolymer.

[3] The positive electrode for the secondary battery as set forth in [1] or [2], wherein a content ratio of said polymer unit having nitrile group in said second polymer is 2 to 50 wt %.

[4] The positive electrode for the secondary battery as set forth in any of [1] to [3], wherein a content ratio of said polymer unit having hydrophilic group in said second polymer is 0.05 to 20 wt %.

[5] The positive electrode for the secondary battery as set forth in any of [1] to [4], wherein carbon atoms of alkyl group binding to non-carbonyl oxygen atom of said (meth) acrylate polymer unit in said second polymer is 4 to 10.

[6] The positive electrode for the secondary battery as set forth in any one of claims 1 to 5, wherein an iodine value of said second polymer is 3 to 60 mg/100 mg.

[7] The positive electrode for the secondary battery as set forth in any one of [1] to [6], wherein a glass transition temperature of said second polymer is 25° C. or less.

[8] A secondary battery comprising a positive electrode, a negative electrode, a separator and an electrolytic solution, wherein said positive electrode is the positive electrode for the secondary battery as set forth in any one of [1] to [7].

Effect of the Present Invention

The positive electrode for the secondary battery for the present invention can prevent the breaking and the cracking of the electrode active material layer since it has excellent electrode flexibility (the winding property) and the binding property. Also, the positive electrode of the present invention comprises high electrode density even before the press; hence the stress during the press can be reduced. Further, the secondary battery using said positive electrode has excellent cycle characteristic.

THE MODE TO CARRY OUT THE INVENTION

[The Positive Electrode for the Secondary Battery]

The positive electrode for the secondary battery of the present invention (it may be referred as "the positive electrode") comprises the current collector, and the positive electrode active material layer formed on said current collector. The positive electrode active material layer comprises the positive electrode active material, the conductive agent and the binder, and other components which are added depending on the needs may be comprised as well.

(The Positive Electrode Active Material)

As for the positive electrode active material, the active material capable of absorbing and releasing the lithium ion is used, and the electrode active material for a positive electrode (positive electrode active material) of a lithium-ion secondary battery can be roughly divided into a group of inorganic compound and a group of organic compound.

The positive electrode active material in the group of inorganic compound may include transition metal oxides, transition metal sulfides, lithium containing complex metal oxides between lithium and the transition metal or so. As the above transition metal, Ti, V, Cr, Mn, Fe, Co, Ni, Cu, Mo or so can be used.

As for the transition metal oxide, MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$, $V_6O_{13}$ or so may be mentioned. Among these, MnO, $V_2O_5$, $V_6O_{13}$, $TiO_2$ are preferable from the point of the cycle stability and the capacity of the obtained secondary battery.

As the transition metal sulfides, $TiS_2$, $TiS_3$, amorphous $MoS_2$, FeS or so may be mentioned.

As the lithium containing complex metal oxides, the lithium containing metal oxide having a layered structure, the lithium containing complex metal oxides having spinel structure, and the lithium containing complex metal oxide having olivine structure or so may be mentioned.

As for the lithium containing complex metal oxide having the layered structure, lithium containing cobalt oxide ($LiCoO_2$), lithium containing nickel oxide ($LiNiO_2$), lithium complex oxide of Co—Ni—Mn, lithium complex oxide of Ni—Mn—Al, lithium complex oxide of Ni—Co—Al, $xLiMaO_2 \cdot (1-x)Li_2MbO_3$ (wherein, $0<x<1$, Ma is one or more transition metal having the average oxidation state of 3+, Mb is one or more transition metal having the average oxidation state of 4+) which is a solid solution of $LiMaO_2$ and $Li_2MbO_3$, or so may be mentioned. From the point of improving the cycle characteristic of the secondary battery, it is preferable to use $LiCoO_2$; and from the point of improving the energy density of the secondary battery, the solid solution of $LiMaO_2$ and $Li_2MbO_3$ is preferable. Also, as the solid solution of $LiMaO_2$ and $Li_2MbO_3$, particularly $xLiMaO_2 \cdot (1-x)Li_2MbO_3$ (wherein, $0<x<1$, Ma=Ni, Co, Fe, Ti or so, Mb=Mn, Zr, Ti or so) is preferable. Among these, $xLiMaO_2 \cdot (1-x)Li_2MnO_3$ (wherein, $0<x<1$, Ma=Ni, Co, Fe, Ti or so) is preferable.

As the lithium containing complex metal oxides having the spinel structure, $Li_a[Mn_{2-x}Md_x]O_4$ (here, Md is one or more transition metal having the average oxidation state of 4+, Md=Ni, Co, Fe, Cu, Cr or so, $0<x<1$, $0 \le a \le 1$) of which a part of Mn of lithium manganite ($LiMn_2O_4$) is substituted by other transition metal or so may be mentioned. Among these, $Li_aFe_xMn_{2-x}O_{4-z}$ ($0 \le a \le 1$, $0<x<1$, $0 \le z \le 0.1$) wherein Mn is substituted by Fe is preferable since it is inexpensive; and $LiNi_{0.5}Mn_{1.5}O_4$ or so wherein Mn is substituted by Ni is preferable since all of $Mn^{3+}$ which is thought to be the cause of the structural deterioration can be substituted, and since it under goes the electric chemical reaction of $Ni^{4+}$ from $Ni^{2+}$, it can have high operation voltage and high capacity.

As the lithium containing complex metal oxide having olivine structure, the olivine type lithium phosphate compound expressed by $Li_yMcPO_4$ (here, Mc is one or more transition metal having the average oxidation state of 3+, and Mc=Mn, Co or so, 0≤y≤2) or so may be mentioned. Mn or Co may be partially substituted by other metal, and as for the metal which can be substituted, Fe, Cu, Mg, Zn, V, Ca, Sr, Ba, Ti, Al, Si, B and Mo or so may be mentioned.

Also, the positive electrode active material having the poly anion structure such as $Li_2MeSiO_4$ (here, Me is Fe, Mn) or so; $LiFeF_3$ having the perovskite structure, and $Li_2Cu_2O_4$ having orthohombus structure or so may be mentioned.

As the organic compound, a conductive polymer such as polyacetylene and poly-p-phenylene can be used. An iron-based oxide which is poor in electric conductivity, may be used by carrying out reduction firing under the presence of the carbon source substance, thereby it can be used as an electrode active material coated with carbon material. Also, these compounds may be partially element substituted. The positive electrode active material may be a mixture of the above mentioned inorganic compound and the organic compound.

The particle diameter of the positive electrode active material used in the present invention may be properly selected depending on the other battery requirements, and 50% volume cumulative diameter is normally 0.1 to 50 μm, preferably 0.4 to 30 μm, and further preferably 1 to 20 μm, in view of improvement in battery characteristics such as load characteristic and cycle characteristic or so. When the 50% volume cumulative diameter is within the range, a secondary battery having excellent output characteristic and large charge-discharge capacity can be obtained, and also it is easy to handle when producing the positive electrode and the slurry composition for the positive electrode for forming the positive electrode active material layer. 50% volume cumulative diameter can be obtained by measuring particle diameter distribution by laser diffraction.

BET specific surface area of the positive electrode active material is preferably 0.1 to 10 $m^2/g$, and more preferably 0.2 to 1.0 $m^2/g$. By having the BET specific surface area of the positive electrode active material within the above range, the slurry composition which is stable, and allows Li to be easily inserted and released to the active material structure can be obtained. Note that, in the present invention, "BET specific surface area" refers to the BET specific surface area by the nitrogen absorption method, and it is a value measured in accordance with ASTM D3037-81.

Also, the positive electrode active material used in the present invention has the charge average voltage against the lithium metal of less than 3.9 V, from the point of the structural stability during the long term cycle of the positive electrode active material itself; and the acid stability of the electrolytic solution. Note that, in the present invention, the charge average voltage refers to the electrical potential wherein the secondary battery is charged to the upper limit of the voltage by the constant current method and when lithium is being released (plateau). The upper limit of the voltage has a risk that the battery may expand when it exceeds said voltage, and it may start to generate the heat, hence it refers to the voltage which is the limit that the safety can be ensured.

(The Conductive Agent)

As the conductive agent, conductive carbons such as acetylene black, Ketjen black, carbon black, graphite, vapor-grown carbon fiber and carbon nanotube or so can be used. By comprising the conductive agent, the electrical connection of the positive electrode active materials against each other can be improved, and the discharge rate characteristic when using the secondary battery can be improved. The content of the conductive agent in the slurry composition for the positive electrode is preferably 1 to 20 parts by weight and more preferably 1 to 10 parts by weight with respect to 100 parts by weight of the total amount of the positive electrode active material.

(The Binder)

The binder used in the present invention includes the first polymer and the second polymer which will be described in the following. In the present invention, by using the binder including the first polymer and the second polymer, the positive electrode for the secondary battery having high flexibility and binding property, and having high density before the press can be formed.

The First Polymer

Said first polymer in the binder is characterized by including the fluorine based polymer. By including the fluorine based polymer, the swelling of the binder against the electrolytic solution is suppressed, as a result, the secondary battery having good high temperature characteristic can be obtained.

The fluorine based polymer used in the present invention is the polymer including the polymer unit of the fluorine containing monomer. Specifically, the homopolymer of the fluorine containing monomer, the copolymer between the fluorine containing monomer and other fluorine containing monomer capable of copolymerizable therewith, the copolymer between the fluorine containing monomer and other monomer copolymerizable therewith, and the copolymer between the fluorine containing monomer, other fluorine containing monomer capable of copolymerizable therewith and other monomer copolymerizable therewith or so may be mentioned.

As for the fluorine containing monomer, vinylidene fluoride, tetrafluoro ethylene, hexafluoro propylene, vinyl chloride trifluoride, vinyl fluoride, perfluoroalkylvinyl ether or so may be mentioned; however vinylidene fluoride is preferable.

The ratio of the polymer unit of the fluorine containing monomer in the fluorine containing polymer is usually 70 wt % or more and 100 wt % or less, and preferably 80 wt % or more and 100 wt %.

As the monomer copolymerizable with the fluorine containing monomer, 1-olefins such as ethylene, propylene, 1-butene or so; aromatic vinyl compounds such as styrene, α-methylstyrene, p-t-butylstyrene, vinyl toluene, chlorostyrene or so; unsaturated nitrile compounds such as (meth) acrylonitrile (abbreviation of acrylonitrile and methacrylonitrile. Same applies herein below); (meth)acrylate compounds such as methyl(meth)acrylate, butyl(meth)acrylate, 2-ethylhexyl(meth)acrylate or so; (meth)acrylic amide compounds such as (meth)acryl amide, N-methylol(meth) acrylic amide, N-butoxymethyl(meth)acrylic amide or so; carboxyl group containing vinyl compounds such as (meth) acrylic acid, itaconic acid, fumaric acid, crotonic acid, maleic acid or so; epoxy group containing unsaturated compound such as allylglycidyl ether, glycidyl(meth)acrylic acid or so; amino group containing unsaturated compound such as dimethylaminoethyl(meth)acrylic acid, diethylaminoethyl(meth)acrylic acid or so; sulfonic acid group containing unsaturated compound such as styrene sulfonic acid, vinyl sulfonic acid, (meth)allyl sulfonic acid or so; sulfate group containing unsaturated compounds such as 3-allyoxy-2-hydroxy propane sulfuric acid or so; phosphate group containing unsaturated compound such as (meth)acrylic acid-3-chloro-2-propyl phosphate, 3-allyoloxy-2-hydroxy propane phosphate or so may be mentioned.

The ratio of the polymer unit of the fluorine containing monomer and the monomer copolymerizable therewith in fluorine containing polymer is usually 0 wt % or more and 30 wt % or less, and preferably 0 wt % or more and 20 wt % or less.

Among the fluorine containing polymer, the polymer including vinylidene fluoride as the fluorine containing monomer, specifically the homopolymer of the vinylidene fluoride, the copolymer between the vinylidene fluoride and other fluorine containing monomer copolymerizable therewith, and the copolymer between the vinylidene fluoride, other fluorine containing monomer copolymerizable therewith, and other monomer copolymerizable therewith are preferable.

Among these, as the first polymer used in the present invention, polyvinylidene fluoride, polytetrafluoroethylene, vinylidene fluoride-hexafluoro propylene copolymer, polyvinylfluoride, tetrafluoroethylene-perfluoroalkyl vinyl ether copolymer or so are preferable.

The weight average molecular weight based on polystyrene standard of the first polymer used in the present invention which is determined by the gel permeation chromatography is preferably 100,000 to 2,000,000, more preferably 200,000 to 1,500,000, and particularly preferably 400,000 to 1,000,000. By having the weight average molecular weight of the first polymer within said range, the positive electrode can be molded in a higher density, and it is easy to regulate to the viscosity which makes it easy to coat during the production of the positive electrode slurry for the secondary positive electrode (herein after, it may be referred as "the positive electrode slurry").

The glass transition temperature (Tg) of the first polymer used in the present invention is preferably 300° C. or less, more preferably 200° C. or less, and particularly preferably 150° C. or less. The lower limit of Tg of the first polymer is not particularly limited, however preferably it is 25° C. or higher, more preferably 50° C. or higher, and particularly preferably 75° C. or higher. By having Tg of the first polymer within the above mentioned range, the positive electrode active material layer of the present invention can have high density and thickness. Also, the glass transition temperature of the first polymer can be regulated by combining various monomers. Tg can be measured based on JIS K 7121; 1987 using a differential scanning calorimeter; however if two or more peaks appears during the differential scanning calorimeter measurement, the peak at the higher side will be determined as Tg.

The production method of first polymer used in the present invention is not particularly limited, and any method of a solution polymerization method, a suspension polymerization method, a bulk polymerization method, and an emulsion polymerization method or so can be used. As for the polymerization reaction, any of an ionic polymerization, a radical polymerization, a living radical polymerization, or so can be used. As for the polymerization initiator used for the polymerization, for example, organic peroxides such as lauroyl peroxide, diisopropylperoxydicarbonate, di-2-ethylhexylperoxydicarbonate, t-butylperoxypivalate, 3,3,5-trimethylhexanoylperoxide or so, azo compounds such as α,α'-azobisisobutyronitrile, ammonium persulfate, potassium persulfate or so may be mentioned.

The first polymer used in the present invention is used as the dispersion or the solution wherein the first polymer (hereinafter, this may be referred as "the first polymer dispersion") is dispersed or dissolved in the dispersant. As the dispersant, it is not particularly limited as long as the first polymer can be dispersed or dissolved uniformly, and water or the organic solvent can be used. The organic solvent may include cyclic aliphatic hydrocarbons such as cyclopentane and cyclohexane or so; aromatic hydrocarbons such as toluene, xylene and cyclobenzene or so; ketones such as acetone, ethylmethyl ketone, diisopropyl ketone, cyclohexanone, methylcyclohexane, ethylcyclohexane or so; chlorine based aliphatic hydrocarbons such as methylene chloride, chloroform, and carbon tetrachloride or so; esters such as ethyl acetate, butyl acetate, γ-butyrolactone, ε-caprolactone or so; acrylonitriles such as acetonitrile, propionitrile or so; ethers such as tetrahydrofurane, ethyleneglycoldiethylether or so; alcohols such as methanol, ethanol, isopropanol, ethyleneglycol, ethyleneglycolmonomethylether or so; amides such as N-methylpyrrolidone, and N,N-dimethylformamide or so may be mentioned.

These dispersants may be used alone or by combining two or more thereof. Among these, water or N-methylpyrrolidone, cyclohexanone, or toluene or so are preferable; since it is industrially used during the production of the positive electrode slurry which will be described in the following, hardly evaporates during the production, as a result the evaporation of the slurry can be reduced and the smoothness of the obtained positive electrode can be improved.

In case the first polymer is dispersed in the dispersant in a particulate form, the average particle diameter of the first polymer dispersed in a particulate form (the dispersed particulate diameter) is preferably 10 to 2000 nm, more preferably 50 to 1500 nm, and particularly preferably 100 to 1000 nm in terms of the volume average particle diameter. When the average particle diameter of the first polymer is within said range, the strength and the flexibility of the obtained positive electrode becomes good.

In case the first polymer is dispersed in the dispersant in a particulate form, the solid portion concentration of the first polymer dispersion is usually 1 to 25 wt %, preferably 3 to 20 wt %, and more preferably 5 to 15 wt %. When the solid portion concentration of the first polymer dispersion is within this range, the processing property during the production of the positive electrode slurry which will be described in the following will be excellent.

The Second Polymer

The second polymer in the binder comprises, a polymer unit having the nitrile group, a polymer unit having a hydrophilic group, (meth)acrylate polymer unit and a linear alkylene polymer unit having carbon atoms of 4 or more.

The polymer unit having the nitrile group is a structural unit formed by polymerizing the monomer capable of forming the polymer unit having the nitrile group. The polymer unit having the hydrophilic group is a structural unit formed by polymerizing the monomer capable of forming the polymer unit having the hydrophilic group. (meth)acrylate polymer unit is a structural unit formed by polymerizing the monomer capable of forming the (meth)acrylate polymer unit. The linear alkylene polymer unit having carbon atoms of 4 or more is a structural unit formed by polymerizing the monomer capable of forming the linear alkylene polymer unit having the carbon atoms of 4 or more, and specifically it refers to the structural unit forming the linear alkylene structure by hydrogenating at least part of the carbon-carbon double bond of the structural unit formed by polymerizing the conjugated diene monomer having carbon atoms of 4 or more. Here, the ratio of each polymer unit in the binder usually matches the ratio (the charge ratio) of the above monomers capable of forming each polymer unit. Note that, in case of forming the linear alkylene polymer unit having the carbon atoms of 4 or more by carrying out the hydrogenation of the structural unit formed by polymerizing the above mentioned conjugated diene monomer, the ratio of the linear alkylene polymer unit having carbon atoms of 4 or more can be regulated by the hydrogenation reaction rate which is described in below. Therefore, the ratio (the charge ratio) of the monomer capable of forming the linear alkylene polymer unit having the carbon atoms of 4 or more matches with the ratio of the total polymer unit hydrogenating the structural unit formed by polymerizing the conjugated diene monomer and non-hydrogenated polymer unit in the binder.

By including (meth)acrylate polymer unit in the second polymer, in the positive electrode slurry for forming the positive electrode active material layer, the second polymer dissolves, and the positive electrode slurry having high stability can be obtained. Further, it has high stability against the electrolytic solution, and particularly it has excellent temperature cycle characteristic.

Also, the second polymer includes preferably 5 to 50 wt %, more preferably 10 to 40 wt %, and particularly preferably 20 to 35 wt % of (meth)acrylate polymer unit.

By setting the content ratio of (meth)acrylate polymer unit in the second polymer within said range, the second polymer dissolves in the dispersant (for example, N-methylpyrrolidone, hereinafter it may be referred as "NMP") of the slurry composition for the positive electrode or the dispersant of the second polymer which will be described in the following, thus the positive electrode slurry having high stability can be obtained. Further, the stability against the electrolytic solution is high, and particularly the high temperature cycle characteristic is excellent.

Also, the carbon atoms of the alkyl group bonded to the non-carbonyl oxygen atom of said (meth)acrylate polymer unit is preferably 4 to 12, more preferably 4 to 10, further preferably 4 to 8. By having the carbon numbers of the alkyl group bonded to the non-carbonyl oxygen atom of said (meth)acrylate polymer unit within said range, the second polymer scarcely elutes out to the electrolytic solution, and the obtained positive electrode slurry has high slurry stability. Further, the obtained electrode has high uniformity and has excellent flexibility.

By including the polymer unit having the hydrophilic group in said second polymer, the positive electrode active material can be dispersed stably in the positive electrode slurry, hence the slurry stability of the positive electrode slurry improves, and thus the gelation of the positive electrode slurry can be prevented.

Also, the second polymer includes preferably 0.05 to 20 wt %, more preferably 0.05 to 10 wt %, further preferably 0.1 to 8 wt %, and particularly preferably 1 to 6 wt % of polymer unit having the hydrophilic group. By setting the content ratio of the polymer unit having the hydrophilic group in the second polymer within the above mentioned range, the binding property between the positive electrode active materials against each other, and the positive electrode active material layer and the following described current collector improves, thus the part of the positive electrode active material can be suppressed from falling off (the powder fall off) during the production step of the positive electrode. According to such second polymer, the positive electrode slurry with high stability can be obtained; further the binding property of the electrode to the current collector is improved, and shows excellent cycle characteristic.

The hydrophilic group of the present invention refers to the salt wherein the functional group which releases the proton in the aqueous solution or the proton of said functional group is substituted with the cation; and specifically, carboxylic acid group, sulfonic acid group, phosphoric acid group, hydroxyl group and the salts thereof or so may be mentioned.

Also, by including the polymer unit having the nitrile group in said second polymer, the dispersibility of the positive electrode active material in the positive electrode slurry composition improves, thus the slurry composition for the positive electrode can be stored in a stable condition for long period of time. As a result, the uniform positive electrode active material layer can be produced easily. Also, the conductivity of the lithium ion becomes good, the internal resistance in the battery becomes small, and the output characteristic of the battery can be improved.

The content ratio of the polymer unit having the nitrile group is preferably 2 to 50 wt %, more preferably 10 to 30 wt %, and particularly 10 to 25 wt %. By having the polymer unit having the nitrile group in the second polymer within the above mentioned range, the dispersibility of the positive electrode active material improves, and positive electrode slurry having high stability can be obtained. As a result, the uniformity of the secondary battery positive electrode becomes excellent. Also, since the stability against the electrolytic solution becomes excellent, the cycle characteristic, particularly the high temperature cycle characteristic becomes excellent.

Also, by including the polymer unit of linear alkylene having carbon atoms of 4 or more in said second polymer, the dispersibility of the conductive agent in the positive electrode slurry improves, and the production of the uniform secondary battery positive electrode becomes easy. As the positive electrode active material and the conductive agent or so are dispersed uniformly in the electrode, the internal resistance decreases, and as a result, the high temperature cycle characteristic and the output characteristic of the battery using this electrode improves. Further, by introducing the linear alkylene polymer unit, the swelling degree of the binder against the electrolytic solution is adjusted, as a result the second polymer having excellent electrolytic solution resistance can be obtained and the battery characteristic is improved.

The carbon atoms of the above mentioned linear alkylene polymer unit is 4 or more, preferably 4 to 16, and further preferably 4 to 12.

The content ratio of the above mentioned linear alkylene polymer unit is preferably 20 to 70 wt %, more preferably 25 to 60 wt %, and particularly preferably 30 to 60 wt %.

As mentioned in the above, the second polymer constituting the binder used in the present invention comprises; the polymer unit having the nitrile group; (meth)acrylate polymer unit; the polymer unit having the hydrophilic group; and the polymer unit of linear alkylene group having carbon atoms of 4 or more. Such second polymer is obtained by carrying out the polymerization reaction of the monomer capable of forming the polymer unit having the nitrile group, the monomer capable of forming the polymer unit having the hydrophilic group, the monomer capable of forming (meth)acrylate polymer unit, and the monomer capable of forming the polymer unit of the linear alkylene having carbon atoms of 4 or more. Note that, the polymer unit of the linear alkylene having carbon atoms of 4 or more can be formed by carrying out the hydrogenation reaction after obtaining the polymer comprising the structural unit having the unsaturated bond (the polymer unit capable of forming the conjugated diene monomer having the carbon atoms of 4 or more).

Hereinafter, the production method of the second polymer used in the present invention will be explained.

As the monomer capable of forming the polymer unit having the nitrile group, α,β-ethylene unsaturated nitrile monomer may be mentioned. As α,β-ethylene unsaturated nitrile monomer, it is not particularly limited as long as it is α,β-ethylene unsaturated compound having the nitrile group, and for example acrylonitrile; α-halogeno acrylonitrile such as α-chloro acrylonitrile, α-bromoacrylonitrile; α-alkylacrylonitrile such as methacrylonitrile or so may be mentioned. Among these, acrylonitrile or methacrylonitrile or so is preferable. These may be used alone or by mixing plurality thereof.

The introduction of the hydrophilic group to the second polymer is carried out by polymerizing the monomer comprising the carboxylic acid group, the sulfonic acid group, the phosphoric acid group and the hydroxyl group, and the salts thereof or so.

As the monomer comprising the carboxylic acid group, monocarboxylic acid and the derivative thereof, dicarboxylic acid and the derivative thereof or so may be mentioned.

As monocarboxylic acid, acrylic acid, methacrylic acid, crotonic acid or so may be mentioned.

As the derivative of monocarboxylic acid, 2-ethylacrylic acid, isocrotonic acid, α-acetoxy acrylic acid, β-trans-aryloxy acrylic acid, α-chloro-β-E-methoxy acrylic acid, β-di-amino acrylic acid or so may be mentioned.

As dicarboxylic acid, maleic acid, fumaric acid, itaconic acid or so may be mentioned.

As the dicarboxylic acid derivative, methyl allyl maleate such as methylmaleic acid, dimethyl maleic acid, phenylmaleic acid, chloromaleic acid, dichloromaleic acid, fluoromaleic acid or so; maleic acid esters such as diphenyl maleate, nonyl maleate, decyl maleate, dodecyl maleate, octadecyl maleate, and fluoroalkyl maleate or so may be mentioned.

Also, acid anhydride which generates the carboxylic acid group by hydrolysis can be used as well. As acid anhydride of the dicarboxylic acid, maleic acid anhydride, acrylic acid anhydride, methyl acrylic acid anhydride, dimethyl acrylic acid anhydride, or so may be mentioned.

Other than these, monoesters and diesters of α,β-ethylene unsaturated polyvalent carboxylic acid such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, dibutyl itaconate or so may be mentioned.

As the monomer having the sulfonic group; vinyl sulfonate, methylvinyl sulfonate, (meth)allyl sulfonate, styrene sulfonate, (meth)acrylic acid-2-ethylsulfonate, 2-acrylamide-2-methylpropane sulfonate, 3-allyloxy-2-hydroxypropane sulfonate or so may be mentioned.

As the monomer having the phosphoric group, 2-(meth)acryloyloxyethyl phosphate, methyl-2-(meth)acryloyloxyethyl phosphate, ethyl-(meth)acryloyloxyethyl phosphate or so may be mentioned.

As the monomer having the hydroxyl group, unsaturated ethylene alcohol such as (meth)allyl alcohol, 3-butene-1-ol and 5-hexene-1-ol; ester alcanol of unsaturated ethylene carboxylic acid such as 2-hydroxyethyl-acrylate, 2-hydroxypropyl-acrylate, 2-hydroxyethyl-methacrylate, 2-hydroxypropyl-methacrylate, di-2-hydroxyethyl-maleate, di-4-hydroxybutyl-maleate, and di-2-hydroxypropyl-itaconate or so; esters of polyalkyleneglycol and (meth)acrylic acid expressed by general formula of $CH_2=CR^1-COO-(C_nH_{2n}O)_m-H$ (m is integers of 2 to 9, n is integers of 2 to 4, and $R^1$ indicates hydrogen or methyl group); mono(meth)acrylates of dihydroxyester of the dicarboxylic acid such as 2-hydroxyethyl-2'-(meth)acryloyl oxyphthalate, 2-hydroxyethyl-2'-(meth)acryloyloxy succinate or so; vinyl ethers such as 2-hydroxyethyl vinyl ether, 2-hydroxypropyl vinyl ether or so; mono(meth)allyl ether of alkylene glycol such as (meth)allyl-2-hydroxy ethyl ethers, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether or so; polyoxyalkylene glycol(meth)monoallyl ether such as diethylene glycol mono(meth)allyl ether, dipropylene glycol mono(meth)allyl ether or so; and mono (meth)allyl ether of halogenated hydroxyl substitute of the polyalkyleneglycol such as glycerin mono(meth)allyl ether, (meth)allyl-2-chloro-3-hydroxypropyl ether, and (meth)allyl-2-hydroxy-3-chloropropyl ether or so; mono(meth)allyl ether of the polyvalent phenol and the halogen substitute thereof such as eugenol and isoeugenol; (meth)allyl thioether of alkylene glycol such as (meth)allyl-2-hydroxyethyl thioether and (meth)allyl-2-hydroxypropyl thioether; or so may be mentioned.

Among these, the hydrophilic group is preferably the carboxylic acid group or the sulfonic acid group since the binding property between the positive electrode active materials with each other, and the binding property of the positive electrode active material layer and the current collector which will be described in the following are excellent; and further preferably it is carboxylic acid group since the transition metal which may elute out from the positive electrode active material can be captured efficiently.

The introduction method of the linear alkylene polymer unit into the second polymer is not particularly limited; however it is preferably the method carrying out the hydrogenation reaction after introducing the polymer unit capable of forming the conjugated diene monomer, since it is easy.

As the conjugated diene monomer, the conjugated diene monomer having the carbon atoms of 4 or more is preferable, and for example 1,3-butadiene, isoprene, 2,3-dimethyl-1,3-butadiene, 1,3-pentadiene or so may be mentioned. Among these, 1,3-butadiene is preferable. These may be used alone or by mixing plurality thereof.

As the monomer capable of forming the (meth)acrylate polymer unit; acrylic acid alkyl ester such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, stearyl acrylate or so; methacrylic acid alkyl ester such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate or so may be mentioned.

Among these, acrylic acid alkyl ester having the alkyl group of the carbon atoms of 4 to 12 which bonds with the non-carbonyl oxygen atom is preferable; since it shows solubility to NMP preferably used as the dispersant of the positive electrode slurry for without eluting to the electrolytic solution, and it can improve the flexibility of the positive electrode and suppress the peel off of the positive electrode when making the winding cell; further the characteristic (the cycle characteristic or so) of the secondary battery using said positive electrode is excellent. Among these, specifically, butyl acrylate, 2-ethylhexyl acrylate and lauryl acrylate are more preferable; and further preferably it is butyl acrylate, 2-ethylhexyl acrylate.

Also, besides the above mentioned polymer unit, the second polymer used for the present invention may comprise other polymer unit of the monomer capable of copolymerizing with the monomer forming these polymer unit. The content ratio of such polymer unit of other monomer is preferably 30 wt % or less, more preferably 20 wt % or less, further preferably 10 wt % or less with respect to entire monomer unit.

As other monomer capable of copolymerizing, for example; aromatic vinyl compound such as styrene, α-methylstyrene, vinyl toluene or so; non-conjugated diene compound such as 1,4-pentadiene, 1,4-hexadiene, vinylnorbornene, dicyclopenta diene or so; α-olefin compound such as ethylene, propylene, 1-butene, 4-methyl-1-pentene, 1-hexene, 1-octene or so; alkoxy alkylester of α,β-ethylene unsaturated carboxylic acid such as methoxyethyl(meth)acrylate, methoxypropyl(meth)acrylate, butoxyethyl(meth)acrylate or so; divinyl compound such as divinyl benzene or so; di(meth)acrylates such as ethylene di(meth)acrylate, diethyleneglycol di(meth)acrylate, ethylene glycol di(meth)acrylate or so; trimethacrylates such as trimethylolpropanetri(meth)acrylate or so; polyfunctional ethylene unsaturated monomer, self-crosslinking compounds such as N-methylol(meth)acrylamide, N—N'-dimethylol(meth)acrylamide or so may be mentioned.

Among these, an aromatic vinyl compound such as styrene, α-methylstyrene or so are preferable, since it shows solubility towards NMP without eluting out to the electrolytic solution when using NMP as the dispersant of the slurry for the positive electrode, and having excellent dispersibility of the positive electrode active material and enables to obtain uniform positive electrode.

Further the second polymer used in the present invention may include, besides the above mentioned monomer component, the monomer copolymerizable therewith. As the monomer copolymerizable therewith, vinyl esters such as vinyl acetate, vinyl propionate, vinyl lactate or so; vinyl ethers such as methyl vinyl ether, ethyl vinyl ether, butyl vinyl ether or so; vinyl ketones such as methyl vinyl ketone, ethyl vinyl ketone, butyl vinyl ketone, hexyl vinyl ketone, isopropenyl vinyl ketone or so; heterocyclic containing vinyl compound such as N-vinyl pyrrolidone, vinylpyridine, vinyl imidazol or so may be mentioned. The second polymer of said constitution can be obtained by carrying out the graft copolymerization of these monomers by appropriate means.

The second polymer used in the present invention is used in a condition of the dispersion or the solution in which said second polymer is dispersed or dissolved in the dispersant (hereinafter, these may be referred as "the second polymer dispersion"). As the dispersant, it is not particularly limited, as long as the second polymer can be dispersed or dissolved uniformly. In the present invention, the dispersant mentioned in the above described first polymer can be used.

In case the second polymer is dispersed in the dispersant in a particle form, the average particle diameter (the dispersed particle diameter) of the second polymer dispersed in a particle form is preferably 50 to 500 nm, more preferably 70 to 400 nm, and particularly preferably 100 to 250 nm. Since the binding property with the above mentioned positive electrode active material or the conductive agent becomes good, the flexibility of the obtained secondary battery improves, and the electrode active material or so is prevented from being released (powder fall off) from the positive electrode for the secondary battery. As a result, the secondary battery using the positive electrode for the secondary battery shows excellent safety and the cycle characteristic.

In case the second polymer is dispersed in the dispersant in a particle form, the solid portion concentration of the second polymer dispersion is usually 15 to 70 wt %, preferably 20 to 65 wt %, and more preferably 30 to 60 wt %. When the solid portion concentration is within this range, the processing during the production of the positive electrode slurry which will be described in below is excellent.

The glass transition temperature (Tg) of the second polymer used in the present invention is preferably 25° C. or less, more preferably 15° C. or less, and particularly preferably 0° C. or less. The lower limit of Tg of the second polymer is not particularly limited, however it is preferably −50° C. or higher, more preferably −45° C. or higher, and particularly preferably −40° C. or higher. By having the Tg of the second polymer within said range, the secondary battery positive electrode of the present invention has excellent strength and flexibility, thus the powder fall off during the production steps of the positive electrode is suppressed, and the temperature cycle characteristic of the secondary battery using said positive electrode can be improved. Note that, the glass transition temperature of the second polymer can be regulated by the combination of various monomers.

Also, the swelling degree of the second polymer against the electrolytic solution which will be described in below is 100 to 500%, preferably 110 to 400%, more preferably 120 to 300%. By having the swelling degree of the second polymer within the above range, the solubility of the second polymer against the electrolytic solution can be suppressed, hence the electrolytic solution resistance and the binding property of the second polymer becomes excellent, and the high temperature cycle characteristic of the secondary battery can be improved.

Here, as the swelling degree, the swelling degree in a solution dissolved with $LiPF_6$ at a concentration of 1.0 mol/L in a mixture solvent formed by mixing ethylene carbonate (EC) and diethyl carbonate (DEC) having the volume ratio at 20° C. of EC:DEC=1:2 is used.

The swelling degree against the electrolytic solution of the second polymer can be regulated within the above mentioned range by regulating the type and the ratio of the entire polymer unit constituting the second polymer. For example, for (meth)acrylate polymer unit, the method of regulating the length or so of the alkyl chain binding with non-carbonyl oxygen atom in the polymer unit may be mentioned.

The swelling degree against the electrolytic solution of the second polymer can be regulated within the above mentioned range by regulating the type and the ratio of the entire polymer unit constituting the second polymer; however also the solubility parameter (hereinafter, it may be referred as "SP value") of the second polymer can be used as an index. For example, the method of using the polymer or the copolymer wherein the solubility parameter (hereinafter, it may be referred as "SP value") is preferably 9.0 $(cal/cm^3)^{1/2}$ or more and less than 11 $(cal/cm^3)^{1/2}$, more preferably 9 to 10.5 $(cal/cm^3)^{1/2}$, and further preferably 9.5 to 10 $(cal/cm^3)^{1/2}$ or so may be mentioned. By having the SP value within said range, a suitable swelling property to the electrolytic solution can be provided to the second polymer while maintaining the solubility to the dispersant of the second polymer or the dispersant of the positive electrode slurry. Thereby, the uniformity of the obtained secondary battery positive electrode and the cycle characteristic of the secondary battery using thereof can be improved.

Here, the SP value can be obtained in accordance with the method recited in J. Brandrup, E. H. Immergut and E. A. Grulk "Polymer Handbook" VII Solubility Parameter Values, p 675-714 (John Wiley & Sons, The fourth edition issued on 1999). For those which is not described in this publication, it can be determined in accordance with a "molecular attraction constant method" proposed by Small. In this method, the SP value of a compound is determined from the following formula using the molecular volume of the molecule of the compound and the sum of molecular attraction constants (G), which are characteristic values of the functional groups (atomic groups) constituting the molecule of the compound.

$$\delta = \Sigma G/V = d\Sigma G/M$$

ΣG: the sum of the molecular attraction constants G
V: the specific volume
M: the molecular weight
d: the specific gravity The iodine value of said second polymer is preferably 3 to 60 mg/100 mg or so, more preferably 3 to 20 mg/100 mg, further preferably 8 to 10 mg/100 mg. By having the iodine value of the second polymer within the above mentioned range, the second polymer has stable chemical structure against the high electrical potential; thus the electrode structure can be maintained over long term cycle and has excellent cycle characteristic. The iodine value is obtained in accordance with JIS K6235; 2006.

The weight average molecular weight based on polystyrene standard of the second polymer used in the present invention which is determined by the gel permeation chromatography is preferably 10,000 to 700,000, more preferably 50,000 to 500,000, and particularly preferably 100,000 to 300,000. By having the weight average molecular weight of the second polymer within the above mentioned range, flexibility is provided to the positive electrode, and further the viscosity can be regulated so that it can be easily coated during the production of the positive electrode slurry.

The production method of the second polymer used in the present invention is not particularly limited, and any method of a solution polymerization method, a suspension polymerization method, a bulk polymerization method, and an emulsion polymerization method or so can be used. As for the polymerization reaction, any of an ionic polymerization, a radical polymerization, a living radical polymerization, or so can be used. As for the polymerization initiator used for the polymerization, for example, organic peroxides such as lauroyl peroxide, diisopropylperoxydicarbonate, di-2-ethylhexylperoxydicarbonate, t-butylperoxypivalate, 3,3,5-trimethylhexanoylperoxide or so, azo compounds such as α,α'-azobisisobutyronitrile, ammonium persulfate, potassium persulfate or so may be mentioned.

The linear alkylene polymer unit is introduced with the structural unit formed by polymerizing the conjugated diene monomer having the carbon atoms of 4 or more (the polymer unit derived from the conjugated diene monomer), then carrying out the hydrogenation reaction. The method of hydrogenation reaction is not particularly limited. By carrying out the hydrogenation reaction, carbon-carbon unsaturated bond derived from the polymer unit capable of forming the conjugated diene is selectively hydrogenated among the unsaturated polymer (a polymer including a polymer unit having a nitrile group, (meth)acrylate polymer unit, polymer unit having hydrophilic group, and a polymer unit capable of forming the conjugated diene monomer) obtained by said polymerization method; thereby the second polymer used in the present invention can be obtained. Also, due to the hydrogenation reaction, the iodine value of the second polymer used in the present invention can be set to the above mentioned range. The second polymer used in the present invention is preferably the hydrogenated acrylonitrile butadiene copolymer (hereinafter, it may be referred as "hydrogenated NMR") comprising the polymer unit having the hydroxyl group and (meth)acrylate polymer unit.

As for the selective hydrogenation method which selectively hydrogenates only the carbon-carbon unsaturated bond derived from the polymer unit capable of forming the conjugated diene monomer of the unsaturated polymer, it may be any of the known methods, a lipid layer hydrogenation method, or an aqueous layer hydrogenation method; however since the content of the impurities (for example, the solidifier or the metal or so) in the obtained second polymer is low, the aqueous layer hydrogenation method is preferable.

In case the production of the second polymer used in the present invention is carried out by the lipid layer hydrogenation method, it is preferably carried out by the following method. That is, first, the dispersion of the unsaturated polymer prepared by the emulsion polymerization is solidified by a salt out, followed by filtration then dissolved in the organic solvent. Next, the hydrogenation reaction (the lipid layer hydrogenation method) was carried out for the unsaturated polymer dissolved in the organic solvent to form the hydride. Then, the obtained hydride solution is carried out with the solidification, filtration, and drying; thereby the second polymer used in the present invention is obtained.

Note that, in case of using alkaline metal caprate salt as the emulsifier, during the steps of solidification by the salt out of the dispersion of the unsaturated polymer, followed by the filtration and the drying, the amount of the caprate salt in the obtained second polymer at the end is prepared to be 0.01 to 0.4 wt %. For example, during the solidification by the salt out of the dispersion, known solidifiers such as magnesium sulfate, sodium chloride, calcium chloride, aluminum sulfate or so can be used; however preferably by using the alkaline earth metal salts such as magnesium sulfate, magnesium chloride, magnesium nitrate or so; or the group 13 metal salt such as aluminum nitrate or so; the amount of the caprate salt comprised in the unsaturated polymer can be reduced. Therefore, as the solidifier, the alkaline earth metal salt or the group 13 metal salt are preferably used, and more preferably the alkaline earth metal salt is preferable. Further, by controlling the used amount and the solidifying temperature thereof, the amount of the caprate salt in the obtained second polymer at the end can be within the above mentioned range. The used amount of the solidifier is preferably 1 to 100 parts by weight, more preferably 5 to 50 parts by weight, and particularly preferably 10 to 50 parts by weight with respect to 100 parts by weight of the amount of the unsaturated polymer which is to be hydrogenated. The solidifying temperature is preferably 10 to 80° C.

As the solvent of the lipid layer hydrogenation method, it is not particularly limited, as long as it is a liquid organic compound which dissolves the unsaturated polymer, benzene, toluene, xylene, hexane, cyclohexane, tetrahydrofuran, methylethylketone, ethyl acetate, cyclohexanone, and acetone or so may be used preferably.

As the catalyst for the lipid layer hydrogenation method, it can be used without any limitation as long as it is known selective hydrogenation catalyst; and palladium based catalyst and rhodium based catalyst are preferable, more preferably it is palladium based catalyst (palladium acetate, palladium chloride and palladium hydroxide or so). Two or more thereof may be used together; however in case of using by combining rhodium based catalyst and palladium based catalyst, it is preferable that the palladium based catalyst is the main active component. These catalysts are usually used by being supported by the carrier. As for the carrier, silica, silica-alumina, alumina, diatom earth, active carbon or so may be mentioned. The used amount of the catalyst is preferably 10 to 5000 ppm, more preferably 100 to 3000 ppm in terms of the metal amount in the hydrogenated catalyst, with respect to the amount of the hydrogenated unsaturated polymer.

The hydrogenation reaction temperature of the lipid layer hydrogenation method is preferably 0 to 200° C., more preferably 10 to 100° C., the hydrogen pressure is preferably 0.1 to 30 MPa, and more preferably 0.2 to 20 MPa; and the reaction time is preferably 1 to 50 hours and more preferably 2 to 25 hours.

Alternatively, in case of carrying out the aqueous hydrogenation method for the production of the second polymer used in the present invention, to the dispersion of the unsaturated polymer prepared by the emulsion polymerization, the water is added depending on the needs to dilute, then the hydrogenation reaction is preferably carried out.

Here, for the aqueous layer hydrogenation method, there are (I) an aqueous layer direct hydrogenation method wherein the hydrogenation is carried out by directly supplying the hydrogen to the reaction system under the presence of the hydrogenation catalyst; and (II) an aqueous layer indirect hydrogenation method wherein the hydrogenation is carried out by the reduction under the presence of the oxidizing agent, the reducing agent and the activator.

In (I) the aqueous layer direct hydrogenation method, the concentration of the unsaturated polymer in the aqueous layer (the concentration at the dispersion state) is preferably 40 wt % or less in order to prevent the aggregation.

Also, as the hydrogenation catalyst being used, it is not particularly limited as long as it is a compound which hardly decomposes by water. As the specific example of the hydrogenation catalyst, for the palladium catalyst, palladium salt of carboxylic acid such as formic acid, propionic acid, lauric acid, succinic acid, oleic acid, futaric acid or so; palladium chlorides such as palladium chloride, dichloro(cyclooctadiene) palladium, dichloro(norbornadiene) palladium, ammonium hexachloropalladium (IV) acid or so; iodine compounds such as palladium iodide or so; palladium sulfate dehydrates or so may be mentioned. Among these, palladium salt of carboxylic acid, dichloro(norbornadiene) palladium, ammonium hexachloropalladium (IV) acid are particularly preferable. The used amount of the hydrogenated catalyst may be determined accordingly; however preferably it is 5 to 6000 ppm, and more preferably 10 to 4000 ppm in terms of metal amount of the hydrogenated catalyst with respect to the amount of the unsaturated polymer being hydrogenated.

The reaction temperature of the aqueous layer direct hydrogenation method is preferably 0 to 300° C., more preferably 20 to 150° C., and particularly preferably 30 to 100° C. If the reaction temperature is too low, the reaction speed may decline, and on the other hand, if it is too high, the side reaction such as the hydrogenation reaction of the nitrile group or so may occur. The hydrogen pressure is preferably 0.1 to 30 MPa, and more preferably 0.5 to 20 MPa. The reaction time is selected by taking the reaction temperature, the hydrogen pressure, and the target hydrogenation ratio or so into consideration.

On the other hand, in (II) the aqueous layer indirect hydrogenation method, the concentration of the unsaturated polymer of the aqueous layer (the concentration at the dispersion state) is preferably 1 to 50 wt %, and more preferably 1 to 40 wt %.

As for the oxidizing agent used in the aqueous layer indirect hydrogenation method, oxygen, air, hydrogen peroxide or so may be mentioned. The used amount of these oxidizing agents are preferably 0.1:1 to 100:1, more preferably 0.8:1 to 5:1 in terms of the mol ratio (the oxidizing agent:carbon-carbon double bond) against the carbon-carbon double bond.

The reducing agent used in the aqueous layer indirect hydrogenation method, hydrazines such as hydrazine, hydrazine hydrates, hydrazine acetate, hydrazine sulfuric acid salt, hydrazine hydrochloride salt or so, or the compound which releases hydrazine may be used. The used amount of these reducing agents are preferably 0.1:1 to 100:1, more preferably 0.8:1 to 5:1 in terms of the mol ratio (the reducing agent:carbon-carbon double bond) against the carbon-carbon double bond.

As the activator used in the aqueous layer indirect hydrogenation method, ions of the metals such as copper, iron, cobalt, lead, nickel, iron, tin or so may be used. The used amount of these activators are preferably 1:1000 to 10:1, and more preferably 1:50 to 1:2 in terms of the mol ratio (the activator:carbon-carbon double bond) against the carbon-carbon double bond.

The reaction in the aqueous layer indirect hydrogenation method is carried out by applying the heat within the range of 0° C. to the reflux temperature; thereby the hydrogenation reaction is carried out. The heating range at this time is preferably 0 to 250° C., more preferably 20 to 100° C., and particularly preferably 40 to 80° C.

In either case of the direct hydrogenation method or indirect hydrogenation method of the aqueous layer, it is preferable to carry out the solidification by salt out, filtration and the drying, after the hydrogenation. The salt out preferably uses, as similar to the salt out of the dispersion of the unsaturated polymer in said lipid layer hydrogenation method, the above mentioned alkaline earth metals or the group 13 metal salts, in order to regulate the amount of the caprate salt in the second polymer after the hydrogenation reaction. Further preferably the alkaline earth metal salt is used. Also, following the solidification, the filtration and the drying step can be carried out by the known method.

Also, the production method of the second polymer used in the present invention is particularly preferably the method carrying out the hydrogenation method by dividing into two steps. Even if the same amount of the hydrogenation catalyst is used, by carrying out the hydrogenation reaction by dividing into two steps, the hydrogenation reaction efficiency can be enhanced. That is, when converting the polymer unit capable of forming the conjugated diene monomer to the linear alkylene structure unit, the iodine value of the second polymer can be made further lower.

In case of carrying out the hydrogenation reaction by dividing into two steps, it is preferable to achieve the hydrogenation reaction rate (hydrogenation rate) (%) of 50% or more, and more preferably 70% or more at the first step. That is, when the value obtained in the below formula is hydrogenation reaction rate (%), this value is preferably 50% or more, and more preferably 70% or more.

The hydrogenation reaction rate(hydrogenation rate) (%)=100×(the amount of the carbon-carbon double bond before the hydrogenation reaction− the amount of the carbon-carbon double bond after the hydrogenation reaction)/(the amount of the carbon-carbon double bond before the hydrogenation reaction)

Note that, the amount of the carbon-carbon double bond can be analyzed by using NMR.

After completing the hydrogenation reaction, the hydrogenation reaction catalyst in the dispersion is removed. As for this method, for example, the method of adding the absorbent such as the activated carbon, and the ion exchange resin or so to absorb the hydrogenation reaction catalyst while stirring, then filtering or centrifuging the dispersion or so may be used. It is also possible to not to remove the hydrogenation reaction catalyst and leave it in the dispersion.

Also, the second polymer used in the present invention comprises the polymer unit having the hydrophilic group. The method of introducing the polymer unit having the hydrophilic group in the second polymer is not particularly limited; and the method of introducing the hydrophilic group in the polymer constituting the second polymer during the production step of the above mentioned second polymer (the method of copolymerizing the monomer having the hydrophilic group); or the method of obtaining the polymer by carrying the hydrogenation reaction to the hydrogenated unsaturated polymer (hereinafter, it may be referred as "hydrogenated polymer") including the above mentioned polymer unit having the nitrile group, the above mentioned (meth)acrylate polymer unit, and the above mentioned polymer unit derived from the conjugated diene monomer; then mixing the hydrogenated polymer and ethylene based unsaturated carboxylic acid or the anhydride thereof (the method of carrying out the acid modification of the hydrogenated polymer) or so may be mentioned. Among these, the method of copolymerizing the monomer having the hydrophilic group is preferable as it is simple. Since the second polymer includes the hydrophilic group, the dispersibility of the positive electrode active material becomes excellent, and the uniform positive electrode can be obtained. Also, the resistance in the positive electrode is reduced; as a result, the secondary battery showing excellent cycle characteristic can be obtained. Further, the binding property between the current collector becomes good, and the positive electrode structure can be maintained even after repeating the charge and discharge, and excellent cycle characteristic can be obtained.

Hereinbelow, the method of producing the second polymer used in the present invention by mixing the ethylene based unsaturated carboxylic acid or the anhydride thereof with the polymer (hereinafter, it may be referred as "acid modified second polymer") after the hydrogenation reaction (the hydrogenated polymer) will be described (the method of carrying out the acid modification of the hydrogenated polymer).

Ethylene based unsaturated carboxylic acid or the anhydride thereof used for the production of the second polymer being acid modified is not particularly limited, however ethylene based unsaturated carboxylic acid having the carbon atoms of 4 to 10 or the anhydride thereof, particularly the maleic acid anhydride is preferable.

As ethylene based unsaturated carboxylic acid, ethylene based unsaturated monocarboxylic acid such as acrylic acid, methacrylic acid or so;

ethylene based unsaturated dicarboxylic acid such as maleic acid, fumaric acid, itaconic acid, citraconic acid or so;

ethylene based unsaturated dicarboxylic acid anhydrides such as maleic acid anhydride, itaconic acid anhydride, citraconic acid anhydride or so;

unsaturated dicarboxylic acid monoalkyl esters such as; monomethyl maleate, monoethyl maleate, monopropyl maleate, mono-n-butyl maleate, monoisobutyl maleate, mono-n-pentyl maleate, mono-n-hexyl maleate, mono-2-ethylhexyl maleate, monomethyl fumarate, monoethyl fumarate, monopropyl fumarate, mono-n-butyl fumarate, monoisobutyl fumarate, mono-n-pentyl fumarate, mono-n-hexyl fumarate, mon-2-ethylhexyl fumarate, monomethyl itaconate, monoethyl itaconate, monopropyl itaconate, mono-n-butyl itaconate, monoisobutyl itaconate, mono-n-pentyl itaconate, mono-n-hexyl itaconate, mono-2-ethylhexyl itaconate, monomethyl citraconate, monoethyl citraconate, monopropyl citraconate, mono-n-butyl citraconate, monoisobutyl citraconate, mono-n-pentyl citraconate, mono-n-hexyl citraconate, mono-2-ethylhexyl citraconate, monomethyl mesaconate, monoethyl mesaconate, monopropyl mesaconate, mono-n-butyl mesaconate, monoisobutyl mesaconate, mono-n-pentyl mesaconate, mono-n-hexyl mesaconate, mono-2-ethylhexyl mesaconate, monomethyl glutaconate, monoethyl glutaconate, monopropyl glutaconate, mono-n-butyl glutaconate, monoisobutyl glutaconate, monoisobutyl glutaconate, mono-n-pentyl glutaconate, mono-n-hexyl glutaconate, mono-2-ethylhexyl glutaconate, monomethyl allylmalonate, monoethyl allylmalonate, monopropyl allylmalonate, mono-n-butyl allylmalonate, monoisobutyl allylmalonate, mono-n-pentyl allylmalonate, mono-n-hexyl allylmalonate, mono-2-ethylhexyl allylmalonate, monomethyl teraconate, monoethyl teraconate, monopropyl teraconate, mono-n-butyl teraconate, monoisobutyl teraconate, mono-n-pentyl teraconate, mono-n-hexyl teraconate, mono-2-ethylhexyl teraconate or so may be mentioned.

The second polymer being acid modified can be obtained by for example carrying out the ene type addition reaction of the hydrogenated polymer and ethylene based unsaturated carboxylic acid or anhydride thereof.

The ene type addition reaction usually occurs by kneading the hydrogenated polymer and ethylene based unsaturated carboxylic acid or anhydride thereof under high temperature without using the radical generator. When the radical generator is used, in addition to the generation of the gelation, the radical type addition reaction occurs between the hydrogenated polymer and ethylene based unsaturated carboxylic acid or anhydride thereof, thus ene type addition reaction cannot take place.

The used amount of the ethylene based unsaturated carboxylic acid or anhydride thereof is not particularly limited; but usually the ethylene based unsaturated carboxylic acid or anhydride thereof is 0.05 to 10 parts by weight, preferably 0.2 to 6 parts by weight with respect to 100 parts by weight of hydrogenated polymer.

During the ene type addition reaction, sufficient addition reaction may not be able to be carried out for example if an open type kneader such as a roll kneader or so is used, since ethylene based unsaturated carboxylic acid or anhydride thereof such as dissolved malic acid anhydride or so may scattered. If the continuous kneader such as a single axis extruder, a same direction twin axis extruder, a different direction rotation twin axis extruder is used, the addition reaction may not be carried out efficiently as the second polymer pilling up at the exit of the extruder forming a gel and causes the die head to clog. Also, a large amount of unreacted ethylene based unsaturated carboxylic acid or anhydride thereof may remain in the second polymer.

In the ene type addition reaction, a heat sealed kneader is preferably used. As for the heat sealed kneader, it can be selected from any of a batch type heat sealed kneader such as a pressure kneader, Bunbury mixer, Brabender or so; and among these, the pressure kneader is preferable.

In the above mentioned production method, before ethylene based unsaturated carboxylic acid or anhydride thereof is added to the hydrogenated polymer by the ene type addition reaction, ethylene based unsaturated carboxylic acid or anhydride thereof is prekneaded at the temperature of which the ene type addition reaction does not substantially take place, specifically at 60 to 170° C. and preferably at 100 to 150° C.; thereby ethylene based unsaturated carboxylic acid or anhydride thereof is uniformly dispersed in the hydrogenated polymer. If the temperature of this prekneading is too low, the hydrogenated polymer slips in the kneader, thus the hydrogenated polymer and ethylene based unsaturated carboxylic acid or anhydride thereof may not be mixed sufficiently. Also, if the prekneading temperature is too high, a large amount of ethylene based unsaturated carboxylic acid or anhydride thereof may scatter, hence the ene type addition reaction efficiency may decline.

Next, in order to carry out the ene type addition reaction, usually the mixture of the hydrogenated polymer and ethylene based unsaturated carboxylic acid or anhydride thereof during the kneading is maintained at 200 to 280° C., and preferably 220 to 260° C. As the method for maintaining said temperature, it is not particularly limited; however it is achieved usually by the method of applying the warm water or the steam to the jacket of the kneader, or by using the shear heat.

In case the warm water or the steam is applied to the jacket of the heat seal kneader, the temperature of the jacket is usually maintained at 70 to 250° C., and preferably 130 to 200° C. Also, in case the shear heat is used, it is preferable to continue the kneading at the shear speed of 30 to 1000 $s^{-1}$, preferably 300 to 700 $s^{-1}$ using the kneader. Particularly, in case of using the shear heat, the regulation of the temperature of the above mentioned mixtures can be carried out easily, hence it is preferable. The kneading time in the heat seal kneader is not particularly limited, however usually it is 120 seconds to 120 minutes, and preferably 180 seconds to 60 minutes.

In case the temperature of the above mentioned mixtures during the kneading is too low, the ene type addition reaction may not sufficiently proceed. Also, in case it is too high, the gelation or the burnt object may occur, as a result, the gel may be mixed into the product. Also, if the shear speed is too large, it is difficult to regulate the temperature of the above mentioned mixture using the shear heat, thus the temperature of the mixture becomes too high. Thereby, the gelation or the burnt object occurs thus it is not preferable as the industrial production method. Also, if the shear speed is too small, the temperature of the above mentioned mixture becomes too low; hence sufficient ene type addition reaction cannot be expected.

In the ene type addition reaction, by adding the antioxidant agent when kneading, the increase of the gelation of the second polymer can be prevented. The type of the antioxidant agent is not particularly limited, and an amine based, an amine ketone based, a phenol based, a benzoimidazol based and other antioxidant agent for the binder can be used.

As for the example of amine based antioxidants, phenyl-1-naphthylamine, alkylated diphenylamine, octylated diphenylamine, 4,4-bis($\alpha,\alpha$-dimethylbenzyl)diphenylamine, p-(p-toluenesulfonylamide)diphenylamine, N,N-di-2-naphtyl-p-phenylenediamine, N,N-diphenyl-p-phenylenediamine, N-phenyl-N-isopropyl-p-phenylenediamine, N-phenyl-N-(1,3-dimethylbutyl)-p-phenylenediamine, N-phenyl-N-(3-methacryloyloxy-2-hydroxypropyl)-p-phenylenediamine or so may be mentioned.

As the example of amineketone based antioxidant agent, 2,2,4-trimethyl-1,2-dihydroxyquinoline, 6-ethoxy-1,2-dihydro-2,2,4-trimethylquinoline or so may be mentioned.

As the example of the phenol based antioxidant agent, 2,6-di-tert-butyl-4-methylphenol, 2,6-di-tert-butyl-4-ethylphenol, 2,2-methylenebis(4-ethyl-6-tert-butylphenol), 2,2-methylenebis(4-methyl-6-tert-butylphenol), 4,4-butylidenebis(3-methyl-6-tert-butylphenol), 4,4-thiobis(3-methyl-6-tert-butylphenol), 2,5-di-tert-butylhydroquinone, 2,5-di-tert-amylhydroquinone or so may be mentioned.

As for the benzoimidazol based antioxidant, metal salts of 2-mercaptobenzoimidazol, 2-mercaptomethylbenzoimidazol, 2-mercaptomethylbenzoimidazol or so may be mentioned.

The used amount of these antioxidant agents are usually 0.01 to 5 parts by weight, preferably 0.1 to 2 parts by weight with respect to 100 parts by weight of the second polymer.

According to the above mentioned production method, 80% or more of the charged amount of ethylene based unsaturated carboxylic acid or anhydride thereof which is used for the ene type addition reaction can be added to the hydrogenated polymer; thereby the second polymer used in the present invention can be obtained. Also, the charged amount of the unreacted ethylene based unsaturated carboxylic acid or anhydride thereof which remains in the second polymer can be made to 5% or less. Therefore, this method is extremely useful from industrial point of stable production. In the present invention, the second polymer including 0.05 to 20 wt % of the polymer unit having the hydrophilic group can be obtained by the above mentioned production method.

The second polymer used in the present invention is preferably obtained through the particulate metal removing step wherein the particulate metal included in the second polymer dispersion is removed during the production steps of the second polymer. By setting the content of the particulate metal included in the second polymer to 10 ppm or less, the metal ion crosslinking between the polymers in the slurry composition for the positive electrode over a period of time is prevented, and the increase of the viscosity can be prevented. Further, there is only a little risk of the internal short circuit or the dissolving depositing during the charging caused by the increase of the self-discharge, thus the cycle characteristic or the safety of the battery improves.

The method of removing the particulate metal component from the second polymer dispersion of said particulate metal removal step is not particularly limited, and for example the method of removing by filtration using the filter, the method of removing by vibrating strainer, the method of removing by the centrifuge, the method of removing by magnetic force or so can be mentioned. Among these, since the object of being removed is a metal component, the method of removal by the magnetic force is preferable. As for the method of removing by the magnetic force, it is not particularly limited as long as it is a method capable of removing the metal component, however considering the productivity and the removal efficiency; preferably it is carried out by placing the magnetic filter in the production line of the second polymer.

The dispersing agent used in the above mentioned polymerization method of the first polymer and the second polymer may be those used in the usual preparation. As specific examples, benzenesulfonate salts such as sodium dodecylbenzenesulfonate, sodium dodecylphenylethersulfonate or so; alkyl sulfate salts such as sodium lauryl sulfate, sodium tetradodecyl sulfate or so; sulfosuccinate salts such as sodium dioctylsulfosuccinate, sodium dihexylsulfosuccinate or so; fatty acid salts such as sodium laurate or so; ethoxy sulfate salts such as sodium polyoxyethylenelaurylethersulfate salt, sodium polyoxyethylenenonylphenylethersulfate salt or so; alkane sulfonate salt; sodium alkyl etherphosphoric acid ester salts; non-ionic emulsifier such as polyoxyethylenenonylphenylether, polyoxyethylenesorbitanelaurylester, copolymer of polyoxyethylene-polyoxypropylene block or so; gelatin, copolymer of maleic acid anhydride-styrene, polyvinylpyrrolidone, sodium polyacrylate, aqueous polymer such as polyvinyl alcohol having the polymerization degree of 700 or more and saponification degree of 75% or more, may be mentioned. These may be used alone or by combining two or more thereof. Among these, preferably it is benzenesulfonate salts such as sodium dodecylbenzenesulfonate, sodium dodecyphenylethersulfonate or so; alkyl sulfate salts such as sodium lauryl sulfate, sodium tetradodecyl sulfate or so; and further preferably it is benzenesulfonate salts such as sodium dodecylbenzenesulfonate, sodium dodecyphenylethersulfonate or so since it has excellent oxidation resistance. The added amount of the dispersing agent can be determined accordingly, and usually it is 0.01 to 10 parts by weight with respect to 100 parts by weight of the entire amount of the monomer.

pH of the first and second polymers used in the present invention when dispersed in the dispersant is preferably 5 to 13, and further preferably 5 to 12, and most preferably 10 to 12. By having pH of the first and second polymers within said range, the storage stability of the binder improves and further the mechanical stability improves as well.

As the pH regulator which regulates pH of said first and second polymers, hydroxides such as alkaline metal hydroxides such as lithium hydroxide, sodium hydroxide, potassium hydroxide; alkaline earth metal hydroxides such as calcium hydroxide, magnesium hydroxide, barium hydroxide, hydroxides of metal belonging to IIIA group in the long period table such as aluminum hydroxides or so; carbonates such as alkaline metal carbonates such as sodium carbonate, potassium carbonate, alkaline earth metal carbonate such as magnesium carbonate or so may be mentioned as examples; and as for the organic amine, alkyl amines such as ethyl amine, diethyl amine, propyl amine or so; alcohol amines such as monomethanol amine, monoethanolamine, monopropanol amine or so; ammoniums such as aqueous ammonia or so may be mentioned. Among these, alkaline metal hydroxides are preferable from the point of the binding property and the handling property, and particularly sodium hydroxide, potassium hydroxide, lithium hydroxide are preferable.

The binder used in the present invention includes the above mentioned first polymer and the second polymer. In the present invention, by using the binder including the first polymer and the second polymer, the positive electrode for the secondary battery having excellent flexibility and the binding property, and having high density even before the press can be formed.

The content ratio of the binder in the positive electrode for the secondary battery is preferably 0.5 to 15 wt %, more preferably 5 to 15 wt %, and particularly preferably 8 to 15 wt %. By having the content ratio of the binder in the positive electrode within said range, a part of the positive electrode active material layer is prevented from being released (the powder fall off) from the positive electrode for the secondary battery of the present invention, and also since the flexibility of the positive electrode can be improved, the cycle characteristic of the secondary battery using said positive electrode can be improved.

The ratio between the first polymer and the second polymer in said binder is 95:5 to 5:95, preferably 90:10 to 40:60, and more preferably 90:10 to 60:40. By setting the ratio of the second polymer against the first polymer within the above mentioned range, the positive electrode having a high flexibility and binding property even when designing for high density and thickness, and also having high density before the press can be obtained. As a result, the force applied during the press of the electrode can be reduced, thus the breaking and cracking or so of the electrode can be effectively prevented.

Also, in said binder, further other binding agent component may be included besides said first polymer and second polymer. As other binding agent component, polyethylene, polyacrylic acid, polyacrylonitrile, polyacrylate, polymethacrylate or so may be mentioned. Also, the copolymer including 50% or more of said resin component can be used as well, for example polyacrylic acid derivative such as acrylic acid-styrene copolymer, acrylic acid-acrylate copolymer or so; polyacrylonitrile derivative such as acrylonitrile-styrene copolymer, acrylonitrile-acrylate copolymer or so may be used. Among these, polyacrylonitrile derivative is preferably used since it shows excellent positive electrode strength and the electrolytic solution resistance.

Further, the soft polymer shown in below, can be used as other binding agent as well.

Homopolymer of acrylic acid or methacrylic acid derivative or copolymer of the same with its copolymerizable monomer, such as polybutyl acrylate, polybutyl methacrylate, polyhydroxyethyl methacrylate, polyacrylamide, polyacrylic nitrile, butyl acrylate styrene copolymer, butyl acrylate acrylic nitrile copolymer and butyl acrylate-acrylic nitrile glycidyl methacrylate copolymer;

silicon containing soft polymers such as dimethyl polysiloxane, diphenyl polysiloxane and dihydroxy polysiloxane;

olefin based soft polymers such as liquid polyethylene, polypropylene, poly-1-butene, ethylene-α-olefin copolymer, propylene-α-olefin copolymer, ethylene-propylene-diene copolymer (EPDM) and ethylene-propylene-styrene copolymer;

vinyl based soft polymers such as polyvinyl alcohol, polyvinyl acetate, poly vinyl stearate and vinyl acetate styrene copolymer;

epoxy based soft polymers such as polyethylene oxide, polypropylene oxide and epichlorohydrin rubber;

other soft polymers such as natural rubber, polypeptide, protein, polyester based thermoplastic elastomer, vinyl chloride based thermoplastic elastomer and polyamide based thermoplastic elastomer or so may be mentioned.

These soft polymers may have a crosslinked structure, or it may be introduced with the functional group by modification. These may be used alone, or by combining two or more thereof. Among these, polyacrylonitrile derivative is preferable for improving the dispersibility of the positive electrode active material.

The content of the entire binding agent in (the amount of the first and second polymer, and other binding agent) the positive electrode active material layer is preferably 0.1 to 10 parts by weight, more preferably 0.5 to 5 parts by weight with respect to 100 parts by weight of the positive electrode active material. By having the content of the entire amount of the binding agent in the positive electrode active material layer of the positive electrode for the secondary battery of the present invention within said range, the binding property between the positive electrode active materials against each other, and the binding property between the positive electrode active material and the current collector becomes excellent, and further the flexibility of the positive electrode can be maintained, while the movement of Li is not interfered and the resistance does not increase.

(The Additives)

The binder of the present invention comprises the above mentioned first polymer and the second polymer, and further it may be added with additives in order to improve the charge-discharge characteristic of the secondary battery or the coating property of the positive electrode slurry which will be described in the following. As for these additives, cellulose based polymer such as carboxymethyl cellulose, methyl cellulose, hydroxypropyl cellulose or so; polyacrylic acid salts such as sodium polyacrylate or so, polyvinyl alcohol, polyethylene oxide, polyvinyl pyrrolidone, acrylic acid-vinyl alcohol copolymer, methacrylic acid-vinyl alcohol copolymer, maleic acid-vinyl alcohol copolymer, modified polyvinyl alcohol, polyethylene glycol, ethylene-vinyl alcohol copolymer, partially saponified product of polyvinyl acetate or so may be mentioned. The used ratio of these additives is preferably less than 300 wt %, more preferably 30 wt % or more and 250 wt % or less, and particularly preferably 40 wt % or more and 200 wt % or less with respect to the total weight of the solid portion of the first polymer and the second polymer. As long as it is within this range, the secondary battery positive electrode having excellent smoothness can be obtained. Also, as the additives, isothiazoline based compound or chelate compound or so can be included as well. These additives can be added to the positive electrode slurry of the present invention besides the method of adding to the binder.

(The Production Method of the Binder)

The production method of the binder used in the present invention is not particularly limited, and it is produced by mixing the above mentioned first polymer dispersion and the second polymer dispersion. The mixing device is not particularly limited as long as the first polymer dispersion and the second polymer dispersion can be mixed uniformly; and for example the method of using the mixing device such as the stirring type, the shaking type, and the rotating type or so may be mentioned. Also, the method using the dispersing kneader such as homogenizer, ball mill, sand mill, roll mill, a planetary kneader such as planetary mixer or so may be mentioned.

(Other Components)

The positive electrode active material layer may include, besides the above mentioned components, other components such as viscosity thickener, reinforcing material, leveling agent, the electrolytic solution additives which has function to suppress the electrolytic solution decomposition or so; and also these may be included in the positive electrode slurry which will be described in the following. These may not be particularly limited, as long as it does not influence the battery reaction.

As the viscosity thickener, the cellulose based polymer such as carboxymethyl cellulose, methyl cellulose, hydroxylpropyl cellulose or so and the ammonium salts and alkaline metal slats thereof; (modified) poly(meth)acrylic acid and the ammonium salts and the alkaline metal salts thereof; the polyvinyl alcohols such as (modified) poly vinyl alcohol, the copolymer of acrylic acid or the acrylic acid salts with the vinyl alcohol, the copolymer of the maleic acid unhydride or the fumaric acid with the vinyl alcohol; polyethylene glycol, polyethylene oxide, poly vinyl pyrrolidone, modified poly acrylic acid, oxidized starch, phosphoric acid starch, casein, various modified starch or so may be mentioned.

The blending amount of the viscosity thickener is preferably 0.5 to 1.5 parts by weight with respect to 100 parts by weight of the positive electrode active material. When the blending amount of the viscosity thickener is within above mentioned range, the coating property and the adhesiveness with the current collector are excellent. In the present invention, "(modified) poly" refers to "unmodified poly" or "modified poly", and "(meth)acrylic" refers to "acrylic" or "methacrylic".

As a reinforcing material, a variety of inorganic and organic fillers having spherical shape, sheet shape, rod shape or fibrous form can be used. By using the reinforcing material, the positive electrode which is strong and flexible can be obtained, and an excellent long term cycle characteristic can be exhibited. The content of the reinforcing material in the positive electrode active material layer is usually 0.01 to 20 parts by weight, and preferably 1 to 10 parts by weight with respect to 100 parts by weight of the total amount of the positive electrode active material. By being within the above mentioned range, high capacity and high load characteristic can be exhibited.

As the dispersing agent, anionic compound, cationic compound, non-ionic compound, polymer compound or so may be mentioned. The dispersing agent is selected depending on the positive electrode active material or the conductivity providing material being used. The content ratio of the dispersing agent in the positive electrode active material layer is preferably 0.01 to 10 wt %. When the content ratio of the dispersing agent is within said range, the stability of the positive electrode slurry which will be described in below becomes excellent, and the smooth electrode can be obtained, further high battery capacity can be exhibited.

As the leveling agent, the surfactants such as alkyl based surfactant, the silicone based surfactant, the fluorine based surfactant, and the metal based surfactant or so may be mentioned. By mixing the leveling agent, the repelling during the coating can be prevented, and the smoothness of the positive electrode can be improved. The content of the leveling agent in the positive electrode active material layer is preferably 0.01 to 10 parts by weight with respect to 100 parts by weight of the total amount of the positive electrode active material. By having the content of the leveling agent within above mentioned range, the productivity of the positive electrode production, the smoothness, and the battery characteristic becomes excellent.

As the antioxidant, phenol compounds, hydroquinone compounds, organophosphorous compounds, sulfur compounds, phenylene diamine compounds, polymer type phenol compounds or so may be mentioned. the polymer type phenol compound is a polymer having a phenol structure in the molecule, and the polymer type phenol compound of the weight molecular weight is 200 to 1000, preferably 600 to 700 is preferably used. The content ratio of the antioxidant in the positive electrode active material layer is preferably 0.01 to 10 wt %, more preferably 0.05 to 5 wt %. By having the content ratio of the antioxidant within the above mentioned range, the stability of the positive electrode slurry which will be described in below will be excellent, and the battery capacity and the cycle characteristic of the secondary battery are excellent.

As the electrolytic solution additive, vinylene carbonate or so which is used in the electrolytic solution can be used. The content of the electrolytic solution additive in the positive electrode active material layer is preferably 0.01 to 10 parts by weight with respect to 100 parts by weight of the total amount of the positive electrode active material. When the electrolytic solution additive is within the above mentioned range, the high temperature cycle characteristic and the high temperature characteristic become excellent. Besides the above mentioned, nano particles such as fumed silica or fumed alumina or so may be mentioned. By mixing such nano particles, thixotropy of the positive electrode slurry can be controlled, and thereby the obtained positive electrode can enhance the leveling property. The content of the nano particles in the positive electrode active material is preferably 0.01 to 10 parts by weight with respect to 100 parts by weight of the total amount of the positive electrode active material. When the nano particles are within the above mentioned range, the slurry stability and the productivity are excellent and the high battery characteristic is exhibited.

(The Current Collector)

The current collector is not particularly limited if this is a material having electric conductivity and electrochemical durability, and for example, metal materials such as iron, copper, aluminum, nickel, stainless steel, titanium, tantalum, gold and platinum are preferable in view of their heat resistance. Among these, aluminum is particularly preferable for current collector of a secondary battery positive electrode. The shape of the current collector is not particularly limited, and the sheet form current collector having a thickness of about 0.001 to 0.5 mm is preferable. It is preferable that the current collector is subject to a roughening treatment in advance before the use, in order to increase the adhering strength with the positive electrode active material layer. Method of the roughening treatment may include mechanical polishing method, electropolishing method, chemical polishing method, etc. In the mechanical polishing positive electrode, a coated abrasive positive electrode in which abrasive particles are fixed, a grinding stone, an emery buff, a wire-brush provided with steel wire or so can be used. Also, an intermediate layer may be formed on the surface of the current collector to increase the adhering strength and conductivity between the positive electrode active material layer and the current collector; and particularly it is preferable to form the conductive adhesive layer.

(The Production Method of the Positive Electrode for the Secondary Battery)

As method for producing the positive electrode for the secondary battery of the present invention, it may be the method of binding the positive electrode active layer to at least one side or preferably both sides of said current collector in a layer form. For example, the positive electrode slurry for the secondary battery is coated and dried on the current collector, then it is carried out with the heat applying treatment for 1 hour or longer at 120° C. or higher if needed, thereby the positive electrode is formed. The method of coating the positive electrode slurry to the current collector is not particularly limited. For example, doctor blade method, dip method, reverse roll method, direct roll method, gravure method, extrusion method, brush method or so may be mentioned. For the drying method, for example, the drying by warm air, hot air or low wet air, vacuum drying, drying method with irradiation of (far-) infrared rays, electron beam and the like may be mentioned. The drying time is usually 5 to 30 minutes, and the drying temperature is 40 to 180° C.

When producing the secondary battery positive electrode of the present invention, it is preferable to have a step of lowering the porosity of the positive electrode active material layer by pressure applying treatment using the metal mold press or roll press or so, after the positive electrode active material layer comprising the positive electrode slurry is formed on the current collector. The preferable range of the porosity is 5 to 30%, and more preferably 7 to 20%. If the porosity is too high, the charging efficiency and the discharging efficiency deteriorate. In case the porosity is too low, the high volume capacity is difficult to obtain, and the positive electrode active material layer is easily released from the current collector which causes the problem of the malfunction to occur easily. Further, in case the curable polymer is used for the binder composition for the positive electrode, it is preferably cured.

Also, in the present invention, the density of the positive electrode active material layer before the press (the pressure treatment) formed on the current collector is preferably 2.2 to 2.8 g/cm$^3$, and more preferably 2.4 to 2.8 g/cm$^3$. By having the density of the positive electrode active material layer before the press within said range, the force applied during the pressure treatment can be reduced, and also the density difference of the positive electrode active material layer between before and after the press can be reduced. Thereby, the breaking and the cracking of the positive electrode active material layer after the press can be effectively prevented.

Note that, the density of the positive electrode active material layer of the positive electrode for the secondary battery after the press is preferably 3.5 g/cm$^3$, and more preferably 3.6 to 4.0 g/cm$^3$. By having the density of the positive electrode active material layer within said range, the battery with high capacity can be obtained.

The thickness of the positive electrode active material layer of the secondary battery positive electrode of the present invention is usually 5 to 300 μm, and preferably 10 to 250 μm. When the thickness of the positive electrode active material layer is within said range, the load characteristic and the cycle characteristic both exhibit high characteristics.

In the present invention, the content ratio of the positive electrode active material of the positive electrode active material layer is preferably 90 to 99.9 wt %, and more preferably 95 to 99 wt %. By having the content ratio of the positive electrode active material within said range, it can exhibit flexibility and the binding property while showing high capacity.

(The Positive Electrode Slurry for the Secondary Battery)

The positive electrode slurry for the secondary battery of the present invention comprises the above mentioned positive electrode active material, the conductive agent, the binder and the dispersant. Hereinafter, the embodiment of using the positive electrode slurry for the secondary battery as the positive electrode slurry for the lithium ion secondary battery will be explained.

(The Dispersant)

As the dispersant, it is not particularly limited as long as the positive electrode active material, the conductive agent and the binder can be dispersed or dissolved uniformly. In the present invention, the dispersant shown as the example in the above mentioned first polymer can be used.

The solid portion concentration of the positive slurry is not particularly limited as long as it is a viscosity capable of coating and immersing, and having fluidity. Usually it is 10 to 80 wt % or so.

Also, in the positive electrode slurry, besides the above mentioned positive electrode active material, the binder, the conductive agent, and the dispersant, the dispersing agent used in the secondary battery positive electrode of aforementioned, or the electrolytic solution additives which has function to suppress the electrolytic solution decomposition or so may be included. These may not be particularly limited, as long as it does not influence the battery reaction.

(The Production of the Positive Electrode Slurry for the Secondary Battery)

The positive electrode slurry for the secondary battery is obtained by mixing the above mentioned positive electrode active material, the binder, the conductive agent and the dispersant. The amount of the dispersant used for preparing the positive electrode slurry is an amount so that the solid portion concentration of the positive electrode slurry is within usually of 40 to 80 wt %, preferably 60 to 80 wt %, and more preferably 72 to 80 wt %. When the solid portion concentration of the positive electrode slurry is within this range, the above mentioned binder can be dispersed uniformly. Further, the difference of the thickness between before and after of drying of the positive electrode slurry can be reduced, thus the residual stress remaining inside the positive electrode can be reduced. Thereby the crack or the binding property of the positive electrode can be improved.

In the present invention, the positive electrode slurry of which the above mentioned component is highly dispersed can be obtained, regardless of the mixing method or the mixing order by using the above mentioned component. The mixing device is not particularly limited as long as the above mentioned components can be mixed uniformly; and for example a beads mill, a ball mill, a roll mill, a sand mill, a pigment disperser, a grinder, an ultrasonic disperser, homogenizer, a planetary mixer, a fill mix or so can be used; however, as it is possible to disperse even under high concentration, a ball mill, a roll mill, a pigment disperser, a grinder, a planetary mixer is particularly preferably used.

The viscosity of the positive electrode slurry is preferably 10 to 100,000 mPa·s, more preferably 100 to 50,000 mPa·s, from the point of uniform coating property, and the slurry stability over the time. Said viscosity is a value measured when the rotational speed is 60 rpm at 25° C. using B type viscometer.

[The Secondary Battery]

The secondary battery of the present invention comprises the positive electrode, the negative electrode, the separator, and the electrolytic solution; and said positive electrode is said positive electrode for the secondary battery.

As for the secondary battery of the present invention, the lithium ion secondary battery or nickel hydrogen secondary battery or so may be mentioned. Among these, the lithium ion secondary batteries is preferable as the improvement of the long term cycle characteristic or the output characteristic or so are most demanded. Hereinafter, the lithium ion secondary battery will be explained.

(The Electrolytic Solution for the Lithium Ion Secondary Battery)

As the electrolytic solution for the lithium ion secondary battery, the organic electrolytic solution can be used wherein the supporting electrolyte is dissolved in the organic solvent. As the supporting electrolyte, the lithium salt may be used. As the lithium salt, it is not particularly limited, and for example, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$ and the like may be mentioned. Among these, $LiPF_6$, $LiClO_4$, $CF_3SO_3Li$ are preferable since these are easily dissolved in the solvent and shows high dissociation degree. Two or more thereof can be used together. As the supporting electrolyte having higher dissociation degree is used, the lithium ion conductivity becomes higher, thus the lithium ion conductivity can be regulated by the type of the supporting electrolyte.

As the organic solvent used for the electrolytic solution for the lithium ion secondary battery, it is not particularly limited as long as the supporting electrolytes can be dissolved. Carbonates such as dimethyl carbonate (DMC), ethylene carbonate (EC), diethyl carbonate (DEC), propylene carbonate (PC), butylene carbonate (BC) and methyl ethyl carbonate (MEC) or so; esters such as γ-butyrolactone and methyl formate or so; ethers such as 1,2-dimethoxy ethane and tetrahydrofuran or so; sulfur-containing compounds such as sulfolane and dimethyl sulfoxide or so may be used. The mixed solvent thereof may be used as well. Among these, the carbonates are preferable as it has high dielectric constant, and the stable electric potential is wide. The lower the viscosity of the used solvent is, the higher the lithium ion conductivity is; thus the lithium ion conductivity can be regulated by the type of the solvent.

Also, it is possible to add the additives to the electrolytic solution for use. As the additives, the compounds of carbonates such as vinylene carbonate (VC) is preferable.

The concentration of the supporting electrolyte in the electrolytic solution for the lithium ion secondary battery is usually 1 to 30 wt %, preferably 5 to 20 wt %. Also, depending on the type of the supporting electrolyte, usually it is used in a concentration of 0.5 to 2.5 mol/L. the ion conductivity tends to decline in case the concentration of the supporting electrolyte is too or too high.

As the electrolytic solution besides the above mentioned, gelatinous form polymer electrolytes immersed in the polymer electrolyte such as polyethyleneoxide, polyacrylonitrile or so; or inorganic solid electrolytes such as lithium sulfide, LiI, $Li_3N$ or so may be mentioned.

(The Separator for the Lithium Ion Secondary Battery)

As the separator for the lithium ion secondary battery, known separators such as the fine porous film or the non-woven fabric comprising aromatic polyamide resin or the polyolefin resin such as polyethylene, polypropylene or so; the porous resin coat including the inorganic ceramic powder, may be used. For example, the fine porous film formed by the resin such as polyolefin type polymer (polyethylene, polypropylene, polybutene, polyvinyl chloride) and the mixture or the copolymer thereof or so; the fine porous film formed by the resin such as polyethylene telephthalate, polycycloolefin, polyether sulfone, polyamide, polyimide, polyimideamide, polyaramid, polycycloolefin, nylon, polytetrafuluoro ethylene or so, the woven fabric wherein the polyolefin type fiber are woven or the non-woven fabric thereof, and the aggregate of the insulating material particles or so may be mentioned. Among these, the fine porous film formed by the polyolefin type resin is preferable since the thickness of the separator as a whole can be made thinner and the capacity per volume can be increased by increasing the active material ratio in the battery.

The thickness of the separator is usually 0.5 to 40 μm, preferably 1 to 30 μm, and more preferably 1 to 10 μm. When it is within this range, the resistance of the separator in the battery becomes smaller, and the processing while forming the battery is superior.

(The Negative Electrode for the Lithium Ion Secondary Battery)

The negative electrode lithium ion secondary battery is formed by stacking the negative electrode active material layer including the negative electrode active material and the negative electrode binder, on the current collector. As the current collector, those mentioned in the positive electrode active material of the secondary battery can be mentioned, and it is not particularly limited as long as it is a material having the electric conductivity and the electrochemical durability; however copper is preferable as the negative electrode of the lithium ion secondary battery.

(The Negative Electrode Active Material for the Lithium Ion Secondary Battery)

As the negative electrode active material for the lithium ion secondary battery negative electrode, for example carbon materials such as amorphous carbon, graphite, natural black lead, mesocarbon microbead and pitch-based carbon fiber, conductive polymer such as polyacene or so may be mentioned. Also, as the negative electrode active material, a metal such as silicon, tin, zinc, manganese, iron and nickel, the alloy thereof, oxide and sulfate salt of the above metal or alloy can be used. In addition, metal lithium, lithium alloy such as Li—Al, Li—Bi—Cd and Li—Sn—Cd, nitride of lithium-transition metal, silicone or so can be used as well. As the negative electrode active material, those adhered with the conductivity supplying material on the surface by the surface mechanical modified method can be used as well. The particle diameter of the negative electrode active material is selected depending on balance between the other requirements of the battery, however the 50% volume cumulative diameter of the negative electrode active material is normally 1 to 50 µm, preferably 15 to 30 µm, in view of improvement in battery characteristics such as initial efficiency, load characteristic and cycle characteristic.

The content ratio of the negative electrode active material of the negative electrode active material layer is preferably 90 to 99.9 wt %, and more preferably 95 to 99 wt %. By having the content ratio of the negative electrode active material within said range, it can exhibit flexibility and the binding property while showing high capacity.

Also, in the negative electrode for the lithium ion secondary battery, besides the above mentioned component, the dispersing agent used in the secondary battery positive electrode of aforementioned, or the electrolytic solution additives which has function to suppress the electrolytic solution decomposition or so may be included. These may not be particularly limited, as long as it does not influence the battery reaction.

(The Negative Electrode Binder for the Lithium Ion Secondary Battery)

As the binder composition for the lithium ion secondary battery negative electrode, known material can be used without any particular limitation. For example, those used in the aforementioned positive electrode for the lithium ion secondary battery such as resins such as polyethylene, polytetrafluoroethylene (PTFE), polyvinylidene fluoride (PVDF), tetrafluoroethylene-hexafluoropropylene copolymer (FEP), polyacrylic acid derivative, polyacrylonitrile derivative or so; soft polymers such as acrylic based soft polymer, diene based soft polymer, olefin based soft polymer, vinyl based soft polymer or so can be used. These may be used alone or by combining two or more thereof.

The thickness of the negative electrode for the lithium ion secondary battery is usually 5 to 300 µm, and more preferably 10 to 250 µm. By having the thickness of the negative electrode within said range, the load characteristic and the energy density both exhibit high characteristic.

The negative electrode for the lithium ion secondary battery can be produced as same as the aforementioned positive electrode.

As the specific production method of the lithium ion secondary battery, the positive electrode and the negative electrode mentioned in above may be layered via the separator, which is then winded or bended depending on the battery shape to fit in the battery case, followed by filling the electrolyte in the battery case and sealing the case. Also, as needed, it is possible to prevent pressure increase inside the battery and overcharge-overdischarge by setting in expanded metal, overcurrent protection element such as fuse and PTC element, and lead plate, etc. The shape of the battery may include coin shape, button shape, sheet shape, cylinder shape, square shape and flattened shape.

EXAMPLE

Hereinbelow, the present invention will be explained using the examples; however the present invention is not to be limited thereto. Note that, parts and % in the present examples are based on weight unless mentioned otherwise. Various physical properties are evaluated as follows in the examples and the comparative examples.

<The Glass Transition Temperature>

The glass transition temperature (Tg) of the first polymer and the second polymer were measured based on JIS K 7121; 1987 using a differential scanning calorimeter (DSC6220SII made by Nanotechnology Corporation). Note that if two or more peaks appear during the differential scanning calorimeter measurement, the peak at the higher side will be determined as Tg.

<The Iodine Value>

100 g of NMP solution of the second polymer was solidified in 1 litter of methanol, and then vacuum dried over night at 60° C. The iodine value of the dried binder was measured in accordance with JIS K6235; 2006.

<The Slurry Solid Portion Concentration>

The solid portion concentration of the slurry was calculated from the below equation.

The slurry solid portion concentration(%)=100×the weight (g) of the entire solid portion(the active material,the conductive agent,the binder)/the weight (g) of(the entire solid portion+the solvent)

<The Electrode Density Before the Press>

The positive electrode plate before the roll press was punched out by the punching machine of circular shape having the diameter of 16 mmϕ to produce the electrode having the diameter of 16 mmϕ. The density of the positive electrode active material layer before the roll press was calculated from the below equation using the obtained electrode. This was defined as the electrode density of the before pressing.

The density of the positive electrode active material layer (g/cm$^3$)=the weight of the positive electrode active material layer (g)/the volume of the positive electrode active material layer (cm$^3$)

The weight of the positive electrode active material layer (g)=the weight of the electrode−the weight of the current collector The volume of the positive electrode active material layer (cm$^3$)=the thickness of the positive electrode active material layer (cm)×the area of the positive electrode active material layer (cm$^2$)

<The Electrode Flexibility>

The rods having a different diameter were placed on the positive electrode active material layer side of the positive electrode, and the positive electrode was wound to the rod, and then evaluated whether the positive electrode active material layer would form a crack. The smaller the diameter of the rod is, the more excellent the winding property of the positive electrode is. When the winding property is excellent, the release of the positive electrode active material layer can be suppressed; thus an excellent cycle characteristic of the secondary battery can be obtained.

A: no crack at 1.2 mmϕ
B: no crack at 1.5 mmϕ
C: no crack at 2 mmϕ
D: no crack at 3 mmϕ
E: no crack at 4 mmϕ

<The Binding Property>

The positive electrode formed with the positive electrode active material layer was cut in a rectangular shape having the size of the width 1.0 cm×the length 10 cm to form a test piece. Then, it was fixed by facing the positive electrode active material layer face up. After pasting the cellophane tape on the positive electrode active material layer surface of the test piece, the stress when peeling the cellophane tape from one end of the test piece to 180° direction at the speed of 50 mm/min was measured. The measurement was carried out for 10 times, and this was determined as the peel strength, and was evaluated in the below standard. The larger the peel strength (N/m) is, the more excellent the binding property of the positive electrode active material layer is.
A: 80 N/m or more
B: 40 N/m or more and less than 80 N/m
C: 10 N/m or more and less than 40 N/m
D: less than 10 N/m
<The High Temperature Cycle Characteristic>

The 5 cells of lithium ion secondary battery produced in the examples and the comparative examples were charged to 4.2V by the constant current method of 0.5 C at the atmosphere of 45° C., then it was discharged until it reached to 3.0V; and this charge and discharge was repeated for 200 cycles. The charge discharge electric capacity maintaining ratio (=the electric capacity after the $200^{th}$ cycle/the electric capacity after $5^{th}$ cycle×100) (%) was obtained; wherein it is expressed by the ratio between the electric capacity after the $200^{th}$ cycle and the electric capacity of after $5^{th}$ cycle. This measurement was carried out to 5 battery cells and the average value of the charge discharge capacity maintaining ratio of each cell was defined as the charge discharge capacity maintaining ratio, and evaluated by the following standard. The larger this value is, the more excellent the high temperature characteristic is.
A: 85% or more
B: 80% or more and less than 85%
C: 70% or more and less than 80%
D: 60% or more and less than 70%
E: 40% or more and less than 60%
F: less than 40%

Example 1

The Production of the First Polymer

As the first polymer, polyvinylidene fluoride (KF polymer #7200, made by KUREHA CORPORATION, Tg 132° C.) was used.
[The Production of the Second Polymer]

To the autoclave with the stirrer, 240 parts of ion exchange water, 2.5 parts of alkylbenzene sodium sulfonate, 20 parts of acrylonitrile, 30 parts of butyl acrylate, and 5 parts of methacrylic acid were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside of the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 20 wt % of the polymer unit having the nitrile group (the polymer unit derived from acrylonitrile), 45 wt % of polymer unit derived from 1,3-butadiene, 5 wt % of the polymer unit (the polymer unit derived from methacrylic acid) having the hydrophilic group (carboxylic acid group), 30 wt % of (meth)acrylate polymer unit (polymer unit derived from butyl acrylate) were included with respect to the entire amount of the polymer. Here, said polymer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the second polymer was −30° C. Note that, the iodine value of the second polymer was 10 mg/100 mg.
[The Production of the Binder]

The NMP solution of said first polymer and the NMP solution of said second polymer were stirred by the planetary mixer so that the ratio of the first polymer and the second polymer in the binder becomes 80:20 in terms of the weight ratio; thereby the NMP solution of the binder was prepared.
[The Production of the Positive Electrode Slurry and the Positive Electrode]

100 parts of lithium cobalate ($LiCoO_2$) (the particle diameter: 12 μm) having the layered structure as the positive electrode active material, 2.0 parts of acetylene black (HS-100: DENKI KAGAKU KOGYO KABUSHIKIGAISHA), 1.0 parts in terms of solid portion equivalent amount of NMP solution of said binder (the solid portion concentration 8.0%) and appropriate amount of NMP were stirred in the planetary mixer; thereby the positive electrode slurry was obtained. The positive electrode slurry which of produced in above was carried out with the evaluation of the slurry stability. The result is shown in Table 1.

As the current collector, the aluminum foil with the thickness of 20 μm was prepared. Said positive electrode slurry was coated on the aluminum foil by the comma coater so that the thickness after drying was 65 μm or so; then it was dried for 20 minutes at 60° C. and 20 minutes at 120° C. Followed by heat treatment for 2 hours at 150° C.; thereby the positive electrode plate was obtained. The electrode density before the press of the electrode plate was 2.42 g/cm$^3$. This positive electrode plate was elongated by applying the pressure using the roll press, and the positive electrode made of the aluminum foil and the positive electrode active material layer having the density of 3.7 g/cm$^3$ was produced. Note that, the thickness of the positive electrode was 70 μm. The produced positive electrode was carried out with the measurement of the electrode flexibility, the binding property, and the density using the produced electrode. The result is shown in Table 1.

[The Production of the Slurry Composition for the Negative Electrode and the Negative Electrode]

To the planetary mixer with the disperser, as the negative electrode active material, synthetic graphite (the average particle diameter: 24.5 μm) having the specific surface area of 4 m$^2$/g, 1 parts in terms of solid portion equivalent of 1% aqueous solution of carboxymethylcellulose ("BSH-12" made by DAI-ICHI KOGYO SEIYAKU CO, LTD.) were added, and the solid portion concentration was adjusted to 55% by ion exchange water, then mixed for 60 minutes at 25° C. Next, it was adjusted to the solid portion concentration of 52% by ion exchange water. Then, it was further mixed for 15 minutes at 25° C. thereby the mixture solution was obtained.

To the above mentioned mixture solution, 1.0 part in terms of solid portion equivalent amount of 40% aqueous dispersion including styrene-butadiene copolymer (the glass transition temperature of −15° C.), and ion exchange water were introduced to adjust the final solid portion concentration to be 50%, then it was further mixed for 10 minutes. This was carried out with the defoaming treatment under reduced pressure; thereby the slurry composition for the negative electrode with good fluidity was obtained.

The slurry composition for the negative electrode was coated on the copper foil having the thickness of 20 μm, which is the current collector, using a comma coater so that the thickness after drying is 150 μm or so, and then it was dried. This drying was done by moving the copper foil in the oven of 60° C. at the speed of 0.5 m/min over two minutes. Then, the heat treatment was carried out at 120° C. for 2 minutes thereby the negative electrode plate was obtained. This negative electrode was elongated by applying the pressure using the roll press, and the negative electrode having the negative electrode active material layer with the thickness of 80 μm was obtained.

[The Preparation of the Separator]

Single layer polypropylene separator (the width 65 mm, the length 500 mm, and the thickness 25 μm, produced by the dry method, the porosity of 55%) was cut to a square shape of 5×5 cm$^2$.

As outer case of the battery, aluminum wrapping material outer case was prepared. The positive electrode obtained in above was cut to a square shape of 4×4 cm$^2$, and it was placed so that the surface of the current collector side contact with the aluminum wrapping material outer case. On the face of the positive electrode active material layer of the positive electrode, the above mentioned square separator was placed. Further, the negative electrode obtained in the above, was cut to a 4.2×4.2 cm$^2$, then this was placed on the separator so that the surface of the negative electrode active material side faces with the separator. Further, LiPF$_6$ solution having a concentration of 1.0M comprising 1.5% of vinylene carbonate (VC) was filled-in. The solvent of this LiPF$_6$ solution was a mixed solution of ethylene carbonate (EC) and ethylmethylcarbonate (EMC) (EC/EMC=3/7 (volume ratio)). Further, in order to seal the opening of the aluminum wrapping material, it was closed by heat seal of 150° C., thereby the lithium ion secondary battery was produced.

For the obtained lithium ion secondary battery, the high temperature cycle characteristic was evaluated. The result is shown in Table 1.

Example 2

The same procedure as the example 1 was carried out to obtain the positive electrode slurry and the positive electrode and to produce the battery, except that the below described polymer was used as the second polymer. The result of each evaluation is shown in Table 1.

To the autoclave with the stirrer, 240 parts of ion exchange water, 2.5 parts of alkylbenzene sodium sulfonate, 5 parts of acrylonitrile, 30 parts of butyl acrylate, and 5 parts of methacrylic acid were introduced in this order. Then, after substituting the inside of the bottle with the nitrogen, 60 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 5 wt % of the polymer unit having the nitrile group (the polymer unit derived from acrylonitrile), 60 wt % of polymer unit derived from 1,3-butadiene, 5 wt % of the polymer unit (the polymer unit derived from methacrylic acid) having the hydrophilic group (carboxylic acid group), 30 wt % of (meth)acrylate polymer unit (polymer unit derived from butyl acrylate) were included with respect to the entire amount of the polymer. Here, said polymer unit derived from 1,3-butadiene was formed from 52.5 wt % of linear alkylene polymer unit having carbon atoms of 4 or more, 2.1 wt % of non-hydrogenated butadiene polymer unit, and 5.4 wt % of 1,2-additive polymer unit. Also, the glass transition temperature of the second polymer was −48° C. Note that, the iodine value of the second polymer was 13 mg/100 mg.

Example 3

The same procedure as the example 1 was carried out to obtain the positive electrode slurry and the positive electrode and to produce the battery, except that the below described polymer was used as the second polymer. The result of each evaluation is shown in Table 1.
[The Production of the Second Polymer]
To the autoclave with the stirrer, 240 parts of ion exchange water, 2.5 parts of alkylbenzene sodium sulfonate, 10 parts of acrylonitrile, 30 parts of butyl acrylate, and 5 parts of methacrylic acid were introduced in this order. Then, after substituting the inside of the bottle with the nitrogen, 55 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 10 wt % of the polymer unit having the nitrile group (the polymer unit derived from acrylonitrile), 55 wt % of polymer unit derived from 1,3-butadiene, 5 wt % of the polymer unit (the polymer unit derived from methacrylic acid) having the hydrophilic group (carboxylic acid group), 30 wt % of (meth)acrylate polymer unit (polymer unit derived from butyl acrylate) were included with respect to the entire amount of the polymer. Here, said polymer unit derived from 1,3-butadiene was formed from 47.9 wt % of linear alkylene polymer unit having carbon atoms of 4 or more, 2.1 wt % of non-hydrogenated butadiene polymer unit, and 5.0 wt % of 1,2-additive polymer unit. Also, the glass transition temperature of the second polymer was −43° C. Note that, the iodine value of the second polymer was 11 mg/100 mg.

Example 4

The same procedure as the example 1 was carried out to obtain the positive electrode slurry and the positive electrode and to produce the battery, except that the below described polymer was used as the second polymer. The result of each evaluation is shown in Table 1.
[The Production of the Second Polymer]
To the autoclave with the stirrer, 240 parts of ion exchange water, 2.5 parts of alkylbenzene sodium sulfonate, 40 parts of acrylonitrile, 30 parts of butyl acrylate, and 5 parts of methacrylic acid were introduced in this order. Then, after substituting the inside of the bottle with the nitrogen, 25 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 40 wt % of the polymer unit having the nitrile group (the polymer unit derived from acrylonitrile), 25 wt % of polymer unit derived from 1,3-butadiene, 5 wt % of the polymer unit (the polymer unit derived from methacrylic acid) having the hydrophilic group (carboxylic acid group), 30 wt % of (meth)acrylate polymer unit (polymer unit derived from butyl acrylate) were included with respect to the entire amount of the polymer. Here, said polymer unit derived from 1,3-butadiene was formed from 20.6 wt % of linear alkylene polymer unit having carbon atoms of 4 or more, 2.1 wt % of non-hydrogenated butadiene polymer unit, and 2.3 wt % of 1,2-additive polymer unit. Also, the glass transition temperature of the second polymer was −10° C. Note that, the iodine value of the second polymer was 8 mg/100 mg.

Example 5

The same procedure as the example 1 was carried out to obtain the positive electrode slurry and the positive electrode and to produce the battery, except that the below described polymer was used as the second polymer. The result of each evaluation is shown in Table 1.
[The Production of the Second Polymer]
To the autoclave with the stirrer, 240 parts of ion exchange water, 2.5 parts of alkylbenzene sodium sulfonate, 20 parts of acrylonitrile, 30 parts of butyl acrylate, and 15 parts of methacrylic acid were introduced in this order. Then, after substituting the inside of the bottle with the nitrogen, 35 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 20 wt % of the polymer unit having the nitrile group (the polymer unit derived from acrylonitrile), 35 wt % of polymer unit derived from 1,3-butadiene, 15 wt % of the polymer unit (the polymer unit derived from methacrylic acid) having the hydrophilic group (carboxylic acid group), 30 wt % of (meth)acrylate polymer unit (polymer unit derived from butyl acrylate) were included with respect to the entire amount of the polymer. Here, said polymer unit derived from 1,3-butadiene was formed from 29.7 wt % of linear alkylene polymer unit having carbon atoms of 4 or more, 2.1 wt % of non-hydrogenated butadiene polymer unit, and 3.2 wt % of 1,2-additive polymer unit. Also, the glass transition temperature of the second polymer was −5° C. Note that, the iodine value of the second polymer was 9 mg/100 mg.

Example 6

The same procedure as the example 1 was carried out to obtain the positive electrode slurry and the positive electrode and to produce the battery, except that the below described polymer was used as the second polymer. The result of each evaluation is shown in Table 1.
[The Production of the Second Polymer]
To the autoclave with the stirrer, 240 parts of ion exchange water, 2.5 parts of alkylbenzene sodium sulfonate, 20 parts of acrylonitrile, 30 parts of butyl acrylate, and 5 parts of acrylic amide-2-methylpropane sulfonic acid was introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 20 wt % of the polymer unit having the nitrile group (the polymer unit derived from acrylonitrile), 45 wt % of polymer unit derived from 1,3-butadiene, 5 wt % of the polymer unit (the polymer unit derived from acrylic amide-2-methylpropane sulfonic acid) having the hydrophilic group (sulfonic acid group), 30 wt % of (meth)acrylate polymer unit (polymer unit derived from butyl acrylate) were included with respect to the entire amount of the polymer. Here, said polymer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the second polymer was −29° C. Note that, the iodine value of the second polymer was 10 mg/100 mg.

Example 7

The same procedure as the example 1 was carried out to obtain the positive electrode slurry and the positive electrode and to produce the battery, except that the below described polymer was used as the second polymer. The result of each evaluation is shown in Table 1.
[The Production of the Second Polymer]

To the autoclave with the stirrer, 240 parts of ion exchange water, 2.5 parts of alkylbenzene sodium sulfonate, 20 parts of acrylonitrile, 15 parts of butyl acrylate, and 5 parts of methacrylic acid were introduced in this order. Then, after substituting the inside of the bottle with the nitrogen, 60 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 20 wt % of the polymer unit having the nitrile group (the polymer unit derived from acrylonitrile), 60 wt % of polymer unit derived from 1,3-butadiene, 5 wt % of the polymer unit (the polymer unit derived from methacrylic acid) having the hydrophilic group (carboxylic acid group), 15 wt % of (meth)acrylate polymer unit (polymer unit derived from butyl acrylate) were included with respect to the entire amount of the polymer. Here, said polymer unit derived from 1,3-butadiene was formed from 52.5 wt % of linear alkylene polymer unit having carbon atoms of 4 or more, 2.1 wt % of non-hydrogenated butadiene polymer unit, and 5.4 wt % of 1,2-additive polymer unit. Also, the glass transition temperature of the second polymer was −38° C. Note that, the iodine value of the second polymer was 13 mg/100 mg.

Example 8

The same procedure as the example 1 was carried out to obtain the positive electrode slurry and the positive electrode and to produce the battery, except that the below described polymer was used as the second polymer. The result of each evaluation is shown in Table 1.

[The Production of the Second Polymer]

To the autoclave with the stirrer, 240 parts of ion exchange water, 2.5 parts of alkylbenzene sodium sulfonate, 20 parts of acrylonitrile, 30 parts of ethyl acrylate, and 5 parts of methacrylic acid were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 20 wt % of the polymer unit having the nitrile group (the polymer unit derived from acrylonitrile), 45 wt % of polymer unit derived from 1,3-butadiene, 5 wt % of the polymer unit (the polymer unit derived from methacrylic acid) having the hydrophilic group (carboxylic acid group), 30 wt % of (meth)acrylate polymer unit (polymer unit derived from ethyl acrylate) were included with respect to the entire amount of the polymer. Here, said polymer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the second polymer was −22° C. Note that, the iodine value of the second polymer was 10 mg/100 mg.

Example 9

The same procedure as the example 1 was carried out to obtain the positive electrode slurry and the positive electrode and to produce the battery, except that the below described polymer was used as the second polymer. The result of each evaluation is shown in Table 1.

[The Production of the Second Polymer]

To the autoclave with the stirrer, 240 parts of ion exchange water, 2.5 parts of alkylbenzene sodium sulfonate, 20 parts of acrylonitrile, 30 parts of 2-ethylhexyl acrylate, and 5 parts of methacrylic acid were introduced in this order. Then, after substituting the inside of the bottle with the nitrogen, 45 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 20 wt % of the polymer unit having the nitrile group (the polymer unit derived from acrylonitrile), 45 wt % of polymer unit derived from 1,3-butadiene, 5 wt % of the polymer unit (the polymer unit derived from methacrylic acid) having the hydrophilic group (carboxylic acid group), 30 wt % of (meth)acrylate polymer unit (polymer unit derived from 2-ethylhexyl acrylate) were included with respect to the entire amount of the polymer.

Here, said polymer unit derived from 1,3-butadiene was formed from 38.8 wt % of linear alkylene polymer unit having carbon atoms of 4 or more, 2.1 wt % of non-hydrogenated butadiene polymer unit, and 4.1 wt % of 1,2-additive polymer unit. Also, the glass transition temperature of the second polymer was −36° C. Note that, the iodine value of the second polymer was 10 mg/100 mg.

Example 10

The same procedure as the example 1 was carried out to obtain the positive electrode slurry and the positive electrode and to produce the battery, except that the below described polymer was used as the second polymer. The result of each evaluation is shown in Table 1.
[The Production of the Second Polymer]
To the autoclave with the stirrer, 240 parts of ion exchange water, 2.5 parts of alkylbenzene sodium sulfonate, 25 parts of acrylonitrile, 39 parts of butyl acrylate, and 2 parts of methacrylic acid were introduced in this order. Then, after substituting the inside of the bottle with the nitrogen, 34 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 25 wt % of the polymer unit having the nitrile group (the polymer unit derived from acrylonitrile), 34 wt % of polymer unit derived from 1,3-butadiene, 2 wt % of the polymer unit (the polymer unit derived from methacrylic acid) having the hydrophilic group (carboxylic group), 39 wt % of (meth)acrylate polymer unit (polymer unit derived from butyl acrylate) were included with respect to the entire amount of the polymer. Here, said polymer unit derived from 1,3-butadiene was formed from 28.8 wt % of linear alkylene polymer unit having carbon atoms of 4 or more, 2.1 wt % of non-hydrogenated butadiene polymer unit, and 3.1 wt % of 1,2-additive polymer unit. Also, the glass transition temperature of the second polymer was −23° C. Note that, the iodine value of the second polymer was 9 mg/100 mg.

Example 11

The same procedure as the example 1 was carried out to obtain the positive electrode slurry and the positive electrode and to produce the battery, except that the below described polymer was used as the second polymer. The result of each evaluation is shown in Table 1.
[The Production of the Binder]
The NMP solution of said first polymer and the NMP solution of said second polymer were stirred by the primary mixer so that the ratio of the first polymer and the second polymer in the binder becomes 50:50 in terms of the weight ratio; thereby the NMP solution of the binder was prepared.

Comparative Example 1

The same procedure as the example 1 was carried out to obtain the positive electrode slurry and the positive electrode and to produce the battery, except that the below described polymer was used as the second polymer. The result of each evaluation is shown in Table 1.
[The Production of the Binder]
The second polymer was not used, and the binder made of NMP solution of said first polymer was produced.

Comparative Example 2

The same procedure as the example 1 was carried out to obtain the positive electrode slurry and the positive electrode and to produce the battery, except that the below described polymer was used as the second polymer. The result of each evaluation is shown in Table 1.
[The Production of the Binder]
The first polymer was not used, and the binder made of NMP solution of said second polymer was produced.

Comparative Example 3

The same procedure as the example 1 was carried out to obtain the positive electrode slurry and the positive electrode and to produce the battery, except that the below described polymer was used as the second polymer. The result of each evaluation is shown in Table 1.
[The Production of the Second Polymer]
To the polymer can A, 10 parts of butyl acrylate, 2.5 part of acrylonitrile, 0.12 part of sodium lauryl sulfate, 79 parts of ion exchange water were added; and 0.2 parts of ammonium persulfate as the polymerization initiator and 10 parts of the ion exchange water were added, then stirred for 90 minutes by heating at 60° C. Then, to other polymer can B, 65 parts of butyl acrylate, 17.5 parts of acrylonitrile, 5 parts of methacrylic acid, 0.7 parts of sodium lauryl sulfate, and 46 parts of ion exchange water were added and stirred. Then, the produced emulsion was sequentially added to the polymer can A from the polymer can B using about 180 minutes, and after stirring for about 120 minutes, then the reaction was completed by cooling when the monomer consumption reached to 95%. Then, pH was adjusted by 4% NaOH aqueous solution; thereby the aqueous dispersion of the polymer was obtained.

To 100 parts of this binder aqueous solution, 320 parts of NMP was added, and the water was evaporated; however NMP did not dissolve, hence the evaluations following this were unable to carry out. After solidifying 100 gram of said NMP solution by 1 littler of methanol, it was vacuum dried over night at 60° C. to obtain the dried product. When the second polymer was analyzed by NMR, 20 wt % of the polymer unit having the nitrile group (the polymer unit derived from acrylonitrile), 5 wt % of the polymer unit (methacrylic acid monomer unit) having the hydroxyl group (carboxylic acid group), 75 wt % of (meth)acrylate polymer unit (the polymer unit derived from butyl acrylate) were included with respect to the entire amount of the polymer. Also, the glass transition temperature of the second polymer was −20° C. Note that, the iodine value of the binder was 0 mg/100 mg.

Comparative Example 4

The same procedure as the example 1 was carried out to obtain the positive electrode slurry and the positive electrode and to produce the battery, except that the below described polymer was used as the second polymer. The result of each evaluation is shown in Table 1.
[The Production of the Second Polymer]

To the autoclave with the stirrer, 240 parts of ion exchange water, 2.5 parts of alkylbenzene sodium sulfonate, 15 parts of acrylonitrile, and 5 parts of methacrylic acid were introduced in this order. Then, after substituting the inside of the bottle with the nitrogen, 80 parts of 1,3-butadiene were pressure introduced, and 0.25 parts of ammonium persulfate was added to carry out the polymerization reaction at the reaction temperature of 40° C. Thereby, the polymer including the polymer unit having nitrile group, (meth)acrylate polymer unit, the polymer unit having hydrophilic group and the polymer unit derived from conjugated diene monomer were obtained. The polymerization transformation rate was 85%, and the iodine value was 280 mg/100 mg.

400 ml (the entire solid portion 48 gram) of the solution, which was prepared by diluting said polymer with water to have the entire solid portion concentration of 12 wt %, was introduced into 1 litter autoclave with the stirrer, and oxygen dissolved in the polymer was removed by flowing the nitrogen gas for 10 minutes; then 75 mg of palladium acetate was added as the hydrogenation reaction catalyst, by dissolving with 180 ml of water wherein 4 times mols of nitric acid was added with respect to Pd. After substituting inside the system with hydrogen gas for 2 times, the content in the autoclave was heated to 50° C. while being pressurized using hydrogen gas to 3 MPa; thereby hydrogenation reaction was carried out for 6 hours (this will be referred as "the first hydrogenation reaction"). Here, the iodine value of the polymer was 35 mg/100 mg.

Next, the autoclave was put back to an atmospheric pressure, then 25 mg of palladium acetate was further added as the hydrogenation reaction catalyst, by dissolving with 60 ml of water wherein 4 times mols of nitric acid was added with respect to Pd. After substituting inside the system with hydrogen gas for 2 times, the content in the autoclave was heated to 50° C. while being pressurized with hydrogen gas to 3 MPa; thereby hydrogenation reaction was carried out for 6 hours (this will be referred as "the second hydrogenation reaction").

Then, after the content was put back to an ambient temperature and the inside of system was made to an nitrogen atmosphere, the second polymer aqueous dispersion was obtained by condensing until it reached the solid portion concentration of 40% using the evaporator. Also, 320 parts of NMP was added to 100 parts of this second polymer aqueous dispersion, then the water was evaporated under reduced pressure; thereby the NMP solution of the above mentioned second polymer as the second polymer was obtained. After solidifying 100 gram of said NMP solution by 1 littler of methanol, it was vacuum dried over night at 60° C. to obtain the dried product. When the second polymer was analyzed by NMR, 15 wt % of the polymer unit having the nitrile group (the polymer unit derived from acrylonitrile), 80 wt % of polymer unit derived from 1,3-butadiene, 5 wt % of the polymer unit (the polymer unit derived from methacrylic acid) having the hydrophilic group (carboxylic group) were included with respect to the entire amount of the polymer. Here, said polymer unit derived from 1,3-butadiene was formed from 70.7 wt % of linear alkylene polymer unit having carbon atoms of 4 or more, 2.1 wt % of non-hydrogenated butadiene polymer unit, and 7.2 wt % of 1,2-additive polymer unit. Also, when the DCS of the second polymer was measured, it showed two peaks; and the glass transition temperature of the second polymer was 105° C. Note that, the iodine value of the second polymer was 20 mg/100 mg.

| | Example 1 | Example 2 | Example 3 | Example 4 | Example 5 | Example 6 | Example 7 | Example 8 | Example 9 | Example 10 | Example 11 | Comparative example 1 | Comparative example 2 | Comparative example 3 | Comparative example 4 |
|---|---|---|---|---|---|---|---|---|---|---|---|---|---|---|---|
| Material of Second polymer | PVDF | ← | ← | ← | ← | ← | ← | ← | ← | ← | ← | ← | NONE | PVDF | ← |
| First polymer Monomer (parts by weight) BD (butadiene) | 45 | 60 | 55 | 25 | 35 | 45 | 60 | 45 | 45 | 34 | 45 | 0 | 45 | 0 | 80 |
| AN (acrylonitrile) | 20 | 5 | 10 | 40 | 20 | 20 | 20 | 20 | 20 | 25 | 20 | 0 | 20 | 20 | 15 |
| EA (ethylacrylate) | | | | | | | | | | | | | | | |
| BA (butylacrylate) | 30 | 30 | 30 | 30 | 30 | 30 | 15 | 20 | | 39 | 30 | 0 | 30 | 75 | 0 |
| 2EHA (2-ethylhexyl acrylate) | | | | | | | | 30 | 30 | | | | | | |
| MAA (methacrylic acid) | 5 | 5 | 5 | 5 | 15 | | 5 | 5 | 5 | 2 | 5 | 0 | 5 | 5 | 5 |
| AMPS (acrylamide-2-methylpropane sulfonic acid) | | | | | | 5 | | | | | | | | | |
| Hydrogenation condition Palladium acetate added amount (mg) first step | 75 | 75 | 75 | 75 | 75 | 75 | 75 | 75 | 75 | 75 | 75 | — | 75 | — | 75 |
| second step | 25 | 25 | 25 | 25 | 25 | 25 | 25 | 25 | 25 | 25 | 25 | — | 25 | — | 25 |
| Composition of Binder First polymer:Second polymer (weight ratio) | 80:20 | 80:20 | 80:20 | 80:20 | 80:20 | 80:20 | 80:20 | 80:20 | 80:20 | 80:20 | 50:50 | 100:0 | 0:100 | 80:20 | 80:20 |
| Second polymer composition Polymer unit having nitrile group (wt %) | 20 | 5 | 10 | 40 | 20 | 20 | 20 | 20 | 20 | 25 | 20 | — | 20 | 20 | 15 |
| Methacrylate polymer unit (wt %) | 30 | 30 | 30 | 30 | 30 | 30 | 15 | 30 | 30 | 39 | 30 | — | 30 | 75 | 0 |
| Polymer unit having hydrophilic group (wt %) | 5 | 5 | 5 | 5 | 15 | 5 | 5 | 5 | 5 | 2 | 5 | — | 5 | 5 | 5 |
| Linear alkylene polymer unit $^t$wt %) | 38.8 | 52.5 | 47.9 | 20.6 | 29.7 | 38.8 | 52.5 | 38.8 | 38.8 | 28.8 | 38.8 | — | 38.8 | — | 70.7 |
| Non-hydrogentated butadiene polymer unit (wt %) | 2.1 | 2.1 | 2.1 | 2.1 | 2.1 | 2.1 | 2.1 | 2.1 | 2.1 | 2.1 | 2.1 | — | 2.1 | — | 2.1 |
| 1,2-additive structure unit $^t$wt %) | 4.1 | 5.4 | 5.0 | 2.3 | 3.2 | 4.1 | 5.4 | 4.1 | 4.1 | 3.1 | 4.1 | — | 4.1 | — | 7.2 |
| Glass transition temperature (° C.) | -30 | -48 | -43 | -10 | -5 | -29 | -38 | -22 | -36 | -23 | -30 | — | -30 | -20 | 105 |
| Iodine value (mg/100 mg) | 10 | 13 | 11 | 8 | 9 | 10 | 13 | 10 | 10 | 9 | 10 | — | 10 | 0 | 20 |
| Slurry solid portion concentration (wt %) | 75 | 75 | 75 | 73 | 68 | 72 | 75 | 74 | 75 | 73 | 76 | 70 | 78 | 69 | 74 |
| Electrode density before the press (g/cm³) | 2.42 | 2.41 | 2.4 | 2.36 | 2.32 | 2.28 | 2.35 | 2.31 | 2.48 | 2.35 | 2.45 | 2.12 | 2.52 | 2.15 | 2.18 |
| Electrode flexibility | A | B | B | C | B | B | A | B | A | B | C | E | A | D | E |
| Binding property | A | A | A | B | C | C | B | C | A | C | A | C | B | D | D |
| High temperature characteristic | A | A | A | A | A | A | B | A | A | A | B | A | C | C | E |

As shown in the Table 1, when the positive electrode of the examples 1 to 11 is used, the secondary battery having excellent balance between the electrode flexibility, the binding property, and the high temperature characteristic can be obtained with respect to the case using the positive electrode of the comparative examples 1 to 4.

The invention claimed is:

1. A positive electrode for a secondary battery comprising a current collector, and a positive electrode active material layer stacked on said current collector and having a positive electrode active material, a conductive agent and a binder; wherein
    said binder includes a first polymer and a second polymer, said first polymer is fluorine containing polymer,
    said second polymer includes a polymer unit having a nitrile group, a polymer unit having a hydrophilic group, (meth)acrylate polymer unit, and a polymer unit of linear alkylene having carbon atoms of 4 or more,
    a content ratio of said polymer unit of linear alkylene having carbon atoms of 4 or more in said second polymer is 30 to 60 wt %,
    a ratio between said first polymer and said second polymer in said binder is 90:10 to 5:95 in terms of weight ratio, and
    an iodine value of said second polymer is 3 to 60 mg/100 mg.

2. The positive electrode for the secondary battery as set forth in claim 1, wherein said first polymer is at least one selected from the group consisting of polyvinylidene fluoride, polytetrafluoroethylene, vinylidene fluoride-hexafluoropropylene copolymer, polyvinylidene fluoride, and tetrafluoroethylene-perfluoroalkyl vinyl ether copolymer.

3. The positive electrode for the secondary battery as set forth in claim 2, wherein a content ratio of said polymer unit having nitrile group in said second polymer is 2 to 50 wt %.

4. The positive electrode for the secondary battery as set forth in claim 2, wherein a content ratio of said polymer unit having hydrophilic group in said second polymer is 0.05 to 20 wt %.

5. The positive electrode for the secondary battery as set forth in claim 2, wherein carbon atoms of alkyl group binding to non-carbonyl oxygen atom of said (meth)acrylate polymer unit in said second polymer is 4 to 10.

6. The positive electrode for the secondary battery as set forth in claim 2, wherein a glass transition temperature of said second polymer is 25° C. or less.

7. The positive electrode for the secondary battery as set forth in claim 1, wherein a content ratio of said polymer unit having nitrile group in said second polymer is 2 to 50 wt %.

8. The positive electrode for the secondary battery as set forth in claim 7, wherein a content ratio of said polymer unit having hydrophilic group in said second polymer is 0.05 to 20 wt %.

9. The positive electrode for the secondary battery as set forth in claim 7, wherein carbon atoms of alkyl group binding to non-carbonyl oxygen atom of said (meth)acrylate polymer unit in said second polymer is 4 to 10.

10. The positive electrode for the secondary battery as set forth in claim 1, wherein a content ratio of said polymer unit having hydrophilic group in said second polymer is 0.05 to 20 wt %.

11. The positive electrode for the secondary battery as set forth in claim 10, wherein carbon atoms of alkyl group binding to non-carbonyl oxygen atom of said (meth)acrylate polymer unit in said second polymer is 4 to 10.

12. The positive electrode for the secondary battery as set forth in claim 7, wherein a glass transition temperature of said second polymer is 25° C. or less.

13. The positive electrode for the secondary battery as set forth in claim 1, wherein carbon atoms of alkyl group binding to non-carbonyl oxygen atom of said (meth)acrylate polymer unit in said second polymer is 4 to 10.

14. The positive electrode for the secondary battery as set forth in claim 1, wherein a glass transition temperature of said second polymer is 25° C. or less.

15. A secondary battery comprising a positive electrode, a negative electrode, a separator and an electrolytic solution, wherein said positive electrode is the positive electrode for the secondary battery as set forth in claim 1.

16. The positive electrode for the secondary battery as set forth in claim 1, wherein said polymer unit of linear alkylene having carbon atoms of 4 or more is formed by hydrogenating at least part of a carbon-carbon double bond of a structural unit formed by polymerizing a conjugated diene monomer having carbon atoms of 4 or more.

* * * * *